(12) United States Patent
Ito

(10) Patent No.: US 8,041,887 B2
(45) Date of Patent: Oct. 18, 2011

(54) MEMORY DEVICE AND CONTROL METHOD THEREOF

(75) Inventor: Takafumi Ito, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/088,489

(22) Filed: Apr. 18, 2011

(65) Prior Publication Data

US 2011/0191531 A1 Aug. 4, 2011

Related U.S. Application Data

(62) Division of application No. 11/868,719, filed on Oct. 8, 2007.

(30) Foreign Application Priority Data

Oct. 20, 2006 (JP) ................................ 2006-286918
Jan. 15, 2007 (JP) ................................ 2007-006386

(51) Int. Cl.
*G06F 12/06* (2006.01)
(52) U.S. Cl. ........ 711/103; 707/831; 711/154; 711/206; 711/207
(58) Field of Classification Search .................. 707/831; 711/103, 154, 206, 207
See application file for complete search history.

(56) References Cited

U.S. PATENT DOCUMENTS

| 5,757,571 | A | 5/1998 | Basham et al. |
| 7,496,493 | B1 | 2/2009 | Stevens |
| 2003/0191623 | A1* | 10/2003 | Salmonsen ..................... 703/24 |
| 2004/0078666 | A1 | 4/2004 | Aasheim et al. |
| 2007/0043924 | A1 | 2/2007 | Ito et al. |
| 2007/0136518 | A1 | 6/2007 | Slater |
| 2009/0248963 | A1 | 10/2009 | Ito |

FOREIGN PATENT DOCUMENTS

| JP | 11-143764 | 5/1999 |
| JP | 2006-40264 | 2/2006 |

\* cited by examiner

*Primary Examiner* — Jae Yu
(74) *Attorney, Agent, or Firm* — Oblon, Spivak, McClelland, Maier & Neustadt, L.L.P.

(57) ABSTRACT

A control method of a memory device including a storage area formed of a nonvolatile semiconductor memory, includes updating a file stored in the storage area by using a file system which supports an incremental write method, recording, in the storage area, an allocation table representing a correlation between a logical address indicating a recording position of the file and a virtual address representing a virtual recording position of the file and management information of the allocation table, and recording position information representing a recording position of the management information in a position information area of the storage area.

5 Claims, 21 Drawing Sheets

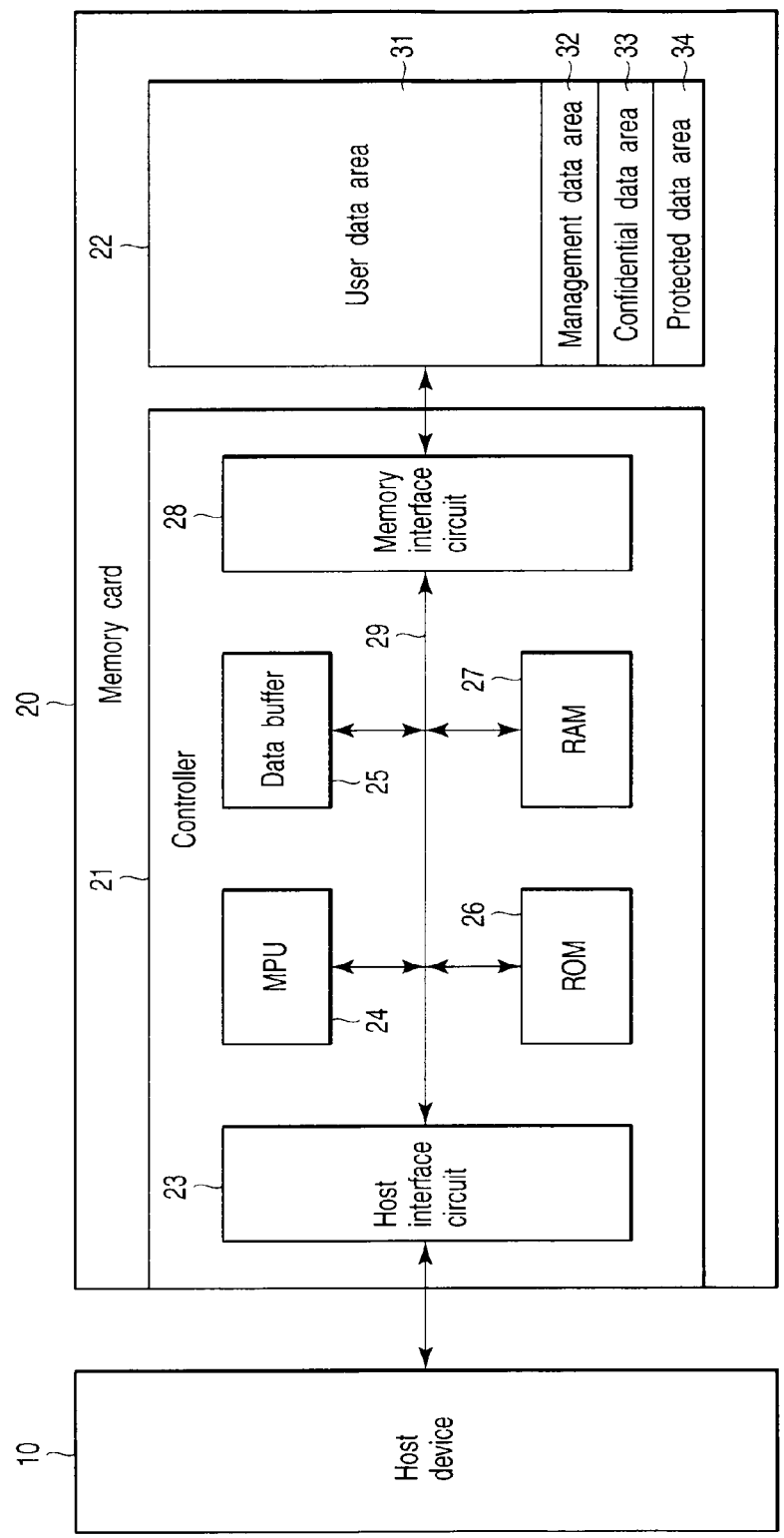
F I G. 1

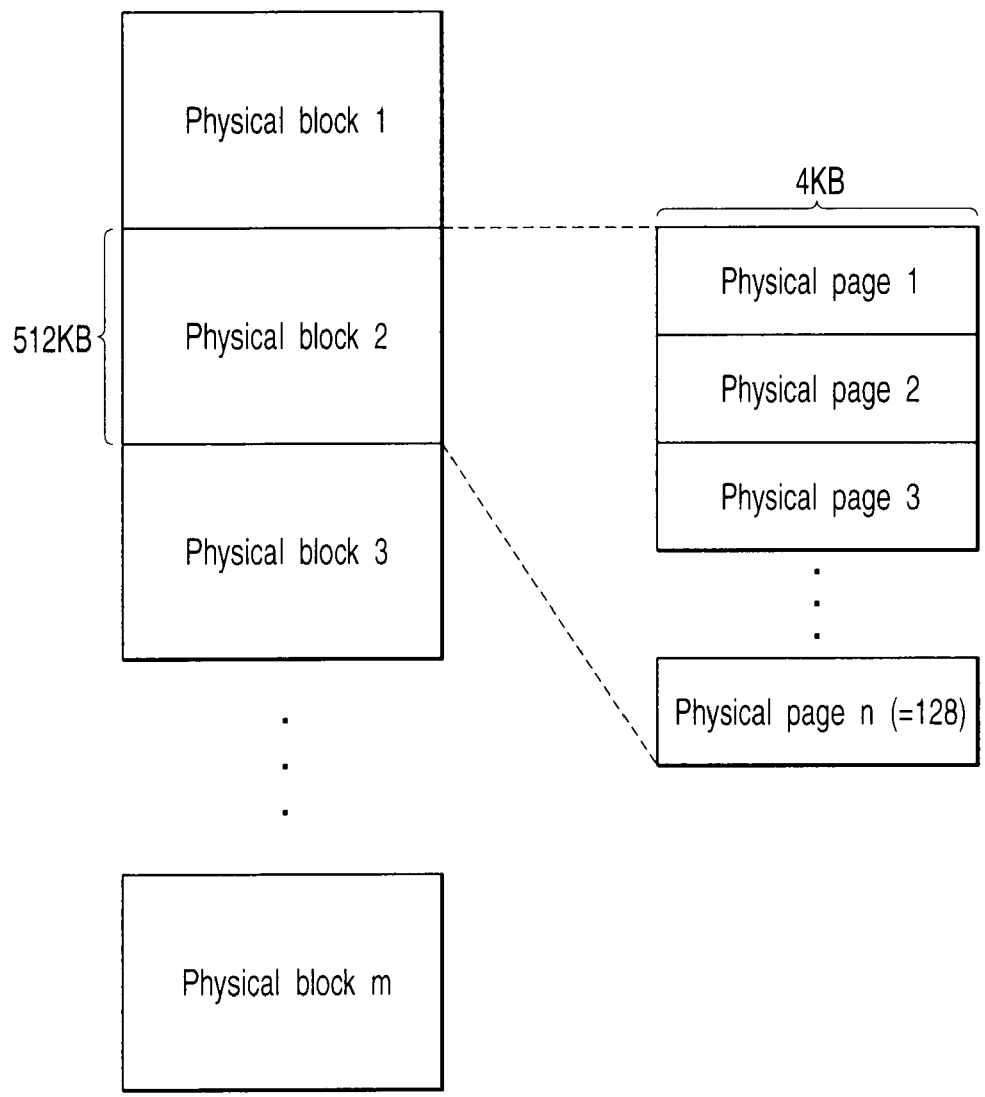
F I G. 2

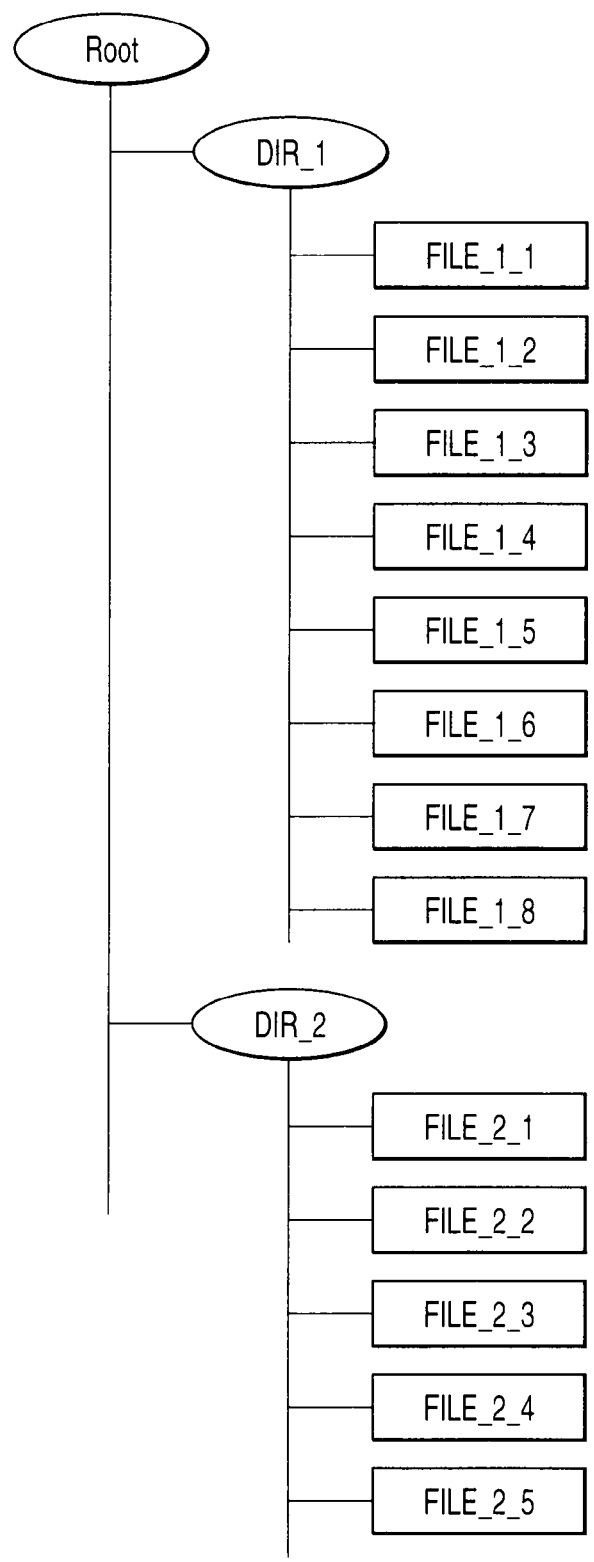
F I G. 3

| LBN | Descriptor | Structure |
|---|---|---|
| 0-79 | Space bitmap descriptor | Space bitmap |
| 80 | File set descriptor | File identifier descriptor |
| 81 | Endpoint descriptor | |
| 82 | File entry (root directory) | Root ICB |
| 83 | File identifier descriptor (parent directory) | Root directory |
| | File identifier descriptor (DIR_1) | |
| | File identifier descriptor (DIR_2) | |
| 84 | File entry (DIR_1) | DIR_1_ICB |
| 85 | File identifier descriptor (parent directory) | DIR_1 directory |
| | File identifier descriptor (FILE_1_1) | |
| | File identifier descriptor (FILE_1_2) | |
| | File identifier descriptor (FILE_1_3) | |
| | File identifier descriptor (FILE_1_4) | |
| | File identifier descriptor (FILE_1_5) | |
| | File identifier descriptor (FILE_1_6) | |
| | File identifier descriptor (FILE_1_7) | |
| | File identifier descriptor (FILE_1_8) | |
| 86 | File entry (FILE_1_1) | DIR_1 file ICB |
| 87 | File entry (FILE_1_2) | |
| 88 | File entry (FILE_1_3) | |
| 89 | File entry (FILE_1_4) | |
| 90 | File entry (FILE_1_5) | |
| 91 | File entry (FILE_1_6) | |
| 92 | File entry (FILE_1_7) | |
| 93 | File entry (FILE_1_8) | |
| 94 | File entry (DIR_2) | DIR_2_ICB |
| 95 | File identifier descriptor (parent directory) | DIR_2 directory |
| | File identifier descriptor (FILE_2_1) | |
| | File identifier descriptor (FILE_2_2) | |
| | File identifier descriptor (FILE_2_3) | |
| | File identifier descriptor (FILE_2_4) | |
| | File identifier descriptor (FILE_2_5) | |
| 96 | File entry (FILE_2_1) | DIR_2 file ICB |
| 97 | File entry (FILE_2_2) | |
| 98 | File entry (FILE_2_3) | |
| 99 | File entry (FILE_2_4) | |
| 100 | File entry (FILE_2_5) | |

FIG. 4

Format information

| |
|---|
| (1) VAT ICB position information acquisition scheme<br>　　　0 = Dedicated interface scheme<br>　　　1 = User data area write scheme |
| (2) VAT ICB position information write scheme<br>　　　0 = Fixed position scheme<br>　　　1 = Regional write-once scheme |
| (3) VAT ICB position information address 1<br>　　　( When (1) = 0, Don't Care ) |
| (4) VAT ICB position information address 2<br>　　　( When (1) = 0, Don't Care ) |
| (5) Physical block size when (2) = 1 |
| (6) Write boundary unit when (2) = 1 |
| (7) VAT ICB position information size |
| (8) On / off of complete formatting<br>　　　0 = Off<br>　　　1 = On |
| (9) Fixed data when (8) = 1 |

FIG. 6

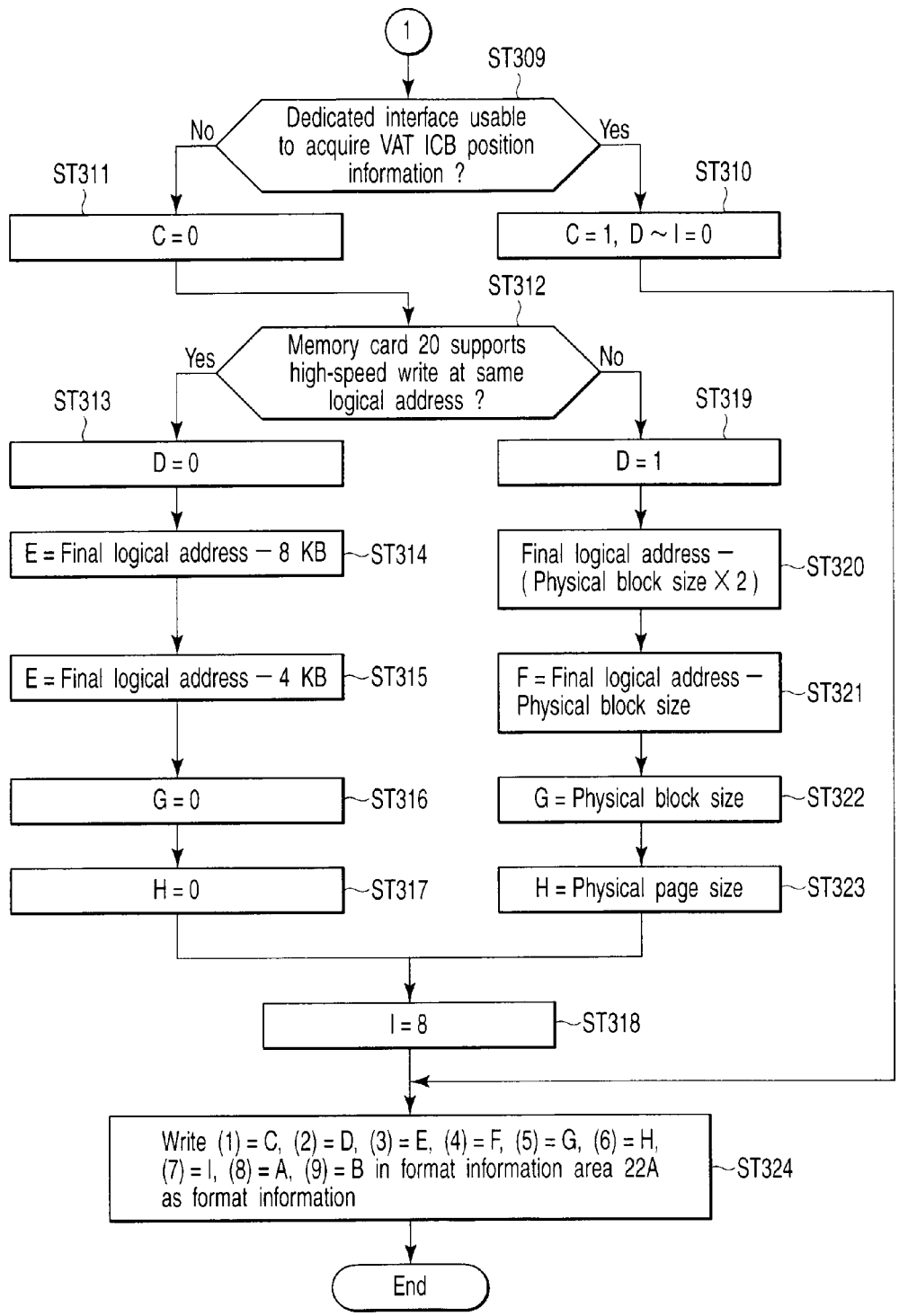
F I G. 12

MEMORY DEVICE AND CONTROL METHOD THEREOF

CROSS-REFERENCE TO RELATED APPLICATIONS

This application is a division of and claims the benefit of priority under 35 U.S.C. §120 from U.S. Ser. No. 11/868,719 filed Oct. 8, 2007, and claims the benefit of priority under 35 U.S.C. §119 from Japanese Patent Applications No. 2006-286918 filed Oct. 20, 2006 and No. 2007-006386 filed Jan. 15, 2007, the entire contents of each of which are incorporated herein by reference.

BACKGROUND OF THE INVENTION

1. Field of the Invention

The present invention relates to a memory device and a control method thereof and, more particularly, to a memory device having a nonvolatile semiconductor memory and a control method thereof.

2. Description of the Related Art

Memory cards including a flash memory that is as a kind of nonvolatile semiconductor memory are used as music data or video data recording media. As the file system of the memory card, for example, a file allocation table (FAT) file system is used. The FAT file system assumes a medium capable of high-speed random rewriting such as a hard disk. In random writing, data is written at random in a free sector independently of the addresses of sectors (units of write areas recognized by the file system).

A typical example of a flash memory used in a memory card is a NAND flash memory. A NAND flash memory can erase data only in blocks. One block includes a plurality of write units, i.e., pages. To rewrite only part of data recorded in a block, it is necessary to write new data to rewrite old data in a new erased block and copy non-rewritten data from the old block containing the old data (data to be rewritten to the new data) to the new block. This process is called a "move-write (collateral copy)". The move-write is done by copying non-rewritten data. Hence, frequent occurrence of a move-write greatly increases the overhead.

In the FAT file system, FAT data is rewritten every time file cluster data is rewritten. For this reason, if the FAT file system is employed as a file system to manage a NAND flash memory, a move-write occurs every time cluster data is rewritten, resulting in lower file rewrite speed.

An associated technique is disclosed, which efficiency manages data stored a block-erase-type flash memory (Jpn. Pat. Appln. KOKAI Publication No. 11-143764).

BRIEF SUMMARY OF THE INVENTION

According to a first aspect of the present invention, there is provided a control method of a memory device including a storage area formed of a nonvolatile semiconductor memory, the method comprising:

updating a file stored in the storage area by using a file system which supports an incremental write method;

recording, in the storage area, an allocation table representing a correlation between a logical address indicating a recording position of the file and a virtual address representing a virtual recording position of the file and management information of the allocation table; and recording position information representing a recording position of the management information in a position information area of the storage area.

According to a second aspect of the present invention, there is provided a memory device using a file system which supports an incremental write method, comprising:

a storage area which includes a nonvolatile semiconductor memory and stores an allocation table representing a correlation between a logical address indicating a recording position of a file and a virtual address representing a virtual recording position of the file and management information of the allocation table, the storage area including a position information area which stores position information representing a recording position of the management information.

According to a third aspect of the present invention, there is provided a memory device using a file system which supports an incremental write method, comprising:

a storage area which is formed of a nonvolatile semiconductor memory and stores a file and management information of the file, the management information being written at an end of a written area every time a file is updated; and a controller which sends a logical address corresponding to a final write position of the written area in response to a read request from the host.

BRIEF DESCRIPTION OF THE SEVERAL VIEWS OF THE DRAWING

FIG. 1 is a block diagram illustrating the arrangement of a host device 10 and a memory card 20 according to the first embodiment of the present invention;

FIG. 2 is a block diagram illustrating the arrangement of a NAND flash memory 22;

FIG. 3 is a view illustrating the structure of directories and files;

FIG. 4 is a view illustrating the structure of a file entry ICB;

FIG. 6 is a view illustrating format information stored in a format information area 22A;

FIG. 12 is a flowchart illustrating the formatting operation of the host device 10 following FIG. 11;

DETAILED DESCRIPTION OF THE INVENTION

Figure 5:
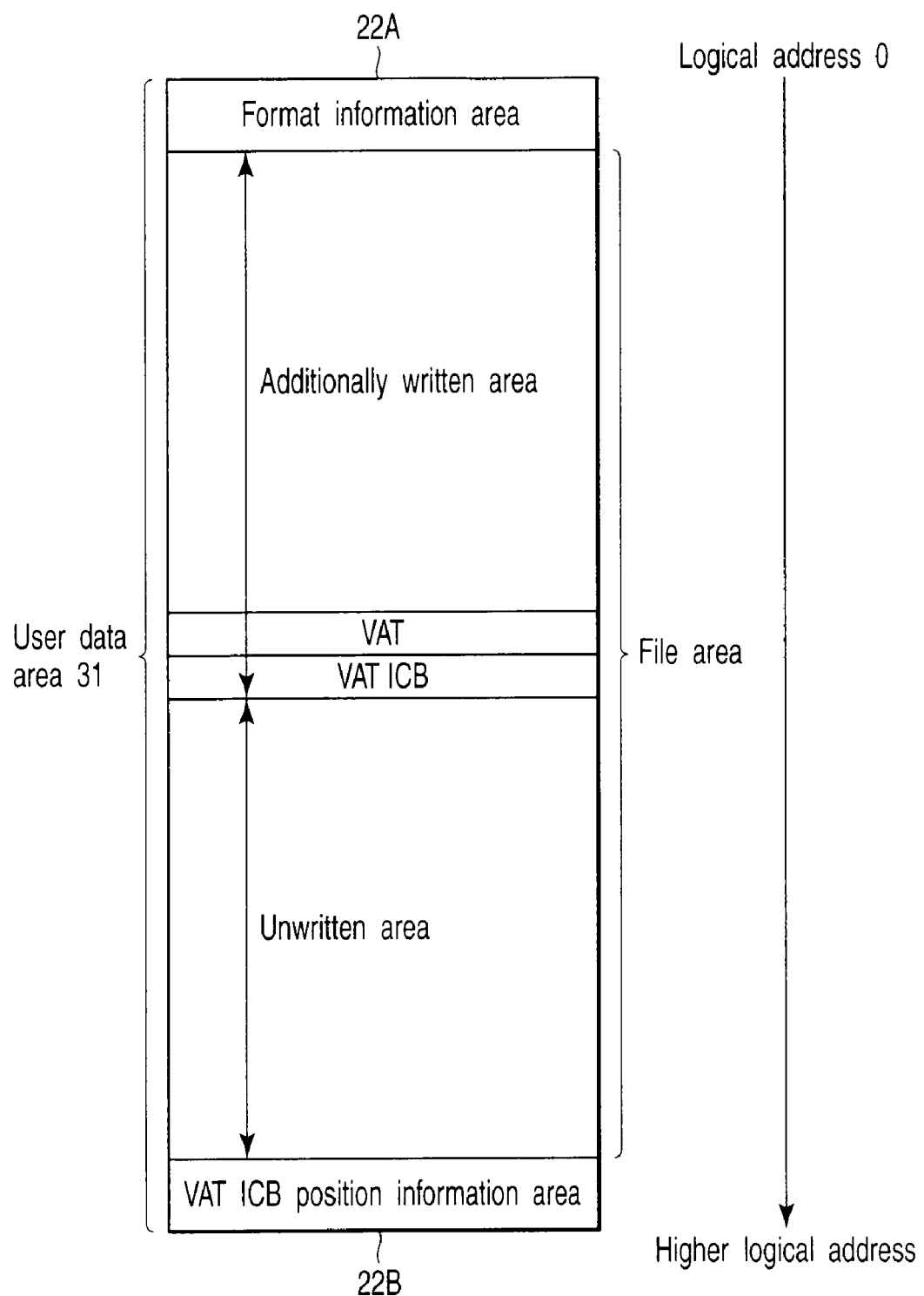
FIG. 5 is a view illustrating the structure of the storage areas of the memory card 20 recognized by the host device 10.

The embodiments of the present invention will be described below with reference to the accompanying drawing. In the following description, the same reference numerals denote elements with the same functions and arrangements. A repetitive description will be done only when necessary.

First Embodiment

[1] Arrangement of Memory Device and Host Device

In this embodiment, a memory card will be exemplified as a memory device. A memory card is designed to be, e.g., attachable to a host device. However, the present invention is not limited to this. A memory device and a host device may be formed as one large-scale integrated circuit (LSI) or LSI package. More specifically, a controller and a nonvolatile semiconductor memory included in a memory device may be mounted on a printed circuit board with a host device.

FIG. 1 is a block diagram illustrating the arrangement of a host device 10 and a memory card 20 according to the first embodiment of the present invention. The memory card 20 is attachable to the host device 10. The memory card 20 is normally attached to the host device 10 and used as a kind of external storage medium of the host device 10.

The memory card 20 includes a nonvolatile semiconductor memory 22. In this embodiment, a NAND flash memory 22 that is a kind of electrically erasable programmable read-only memory (EEPROM) for electrically writing and erasing data will be exemplified as the nonvolatile semiconductor memory 22. The arrangement shown in FIG. 1 includes one NAND flash memory 22. However, it may include two or more NAND flash memories 22.

Each of flash memory cells (memory cell transistors) included in the NAND flash memory 22 has a stacked gate structure in which a tunnel insulating film, a floating gate electrode aiming at charge storage, a gate insulating film, and a control gate electrode are stacked on a semiconductor substrate. The plurality of memory cell transistors connect in series in the column direction while adjacent transistors share the source or drain regions. Select gate transistors are arranged at two ends, thereby forming a NAND cell unit.

A plurality of units are arrayed in the row direction (running direction of word lines WL) to form a block. This block is a data erase unit. In one block, a plurality of memory cells connected to the same word line WL are handled as a page. Data writing and data reading are carried out in each page.

As shown in FIG. 2, the NAND flash memory 22 has m physical blocks 1 to m. One physical block includes n physical pages 1 to n. In this embodiment, one physical block has a size of 512 KB, and one physical page has a size of 4 KB. That is, one physical block has 128 pages.

The data write area of the flash memory 22 is divided into a plurality of areas in accordance with data to be saved. The flash memory 22 has a user data area 31, management data area 32, confidential data area 33, and protected data area 34 as data storage areas.

The user of the memory card 20 can freely access and use the user data area 31 which stores user data. The protected data area 34 which stores important data is accessible only when the host device 10 proves to be authentic upon mutual authentication between the host device 10 and the memory card 20 connected to it. The management data area 32 mainly stores management information about the memory card 20, i.e., card information and controller management information such as a medium ID of the memory card 20. The confidential data area 33 that saves key information to be used for encryption and confidential data to be used for authentication is inaccessible from the host device 10.

The memory card 20 has a controller 21 which is provided between the host device 10 and the flash memory 22 and controls the flash memory 22 on the basis of commands from the host device 10. The controller 21 includes a host interface circuit 23, microprocessing unit (MPU) 24, data buffer 25, read-only memory (ROM) 26, random access memory (RAM) 27, memory interface circuit 28, and bus 29.

The host interface circuit 23 connects to the host device 10 via a connector (not shown). The host interface circuit 23 is a functional block which transmits/receives commands and various kinds of data to/from the host device 10 in accordance with a predetermined protocol under the control of the MPU 24.

The MPU 24 comprehensively controls the overall operation of the memory card 20 via the bus 29. For example, when the memory card 20 receives power supply, the MPU 24 executes fundamental control of the memory card 20 on the basis of firmware stored in the ROM 26. The MPU 24 also receives a write command, read command, or erase command from the host device 10 and executes a data transfer process for the flash memory 22.

The data buffer 25 is a functional block to temporarily hold data read from the flash memory 22 and data to be written in the flash memory 22. That is, the data buffer 25 holds data read from the flash memory 22 until the host device 10 is ready to receive it. The data buffer 25 also holds data to be written in the flash memory 22 until the flash memory 22 is ready to write it.

The memory interface circuit 28 connects to the flash memory 22 via a bus and executes a series of memory access control necessary for access to the flash memory 22. More specifically, the memory interface circuit 28 executes a write operation, read operation or erase operation for the flash memory 22 under the control of the MPU 24.

The ROM 26 stores firmware (control program). This firmware is a program for fundamental control of the memory card 20. The RAM 27 serves as a work area of the MPU 24 and stores control programs and various kinds of tables.

The host device 10 has hardware and software (system) to access to the attached memory card 20. Examples of the host device 10 are a personal computer, digital camera, and information processing device including a portable phone terminal which process various kinds of data including image data, music data, and ID data.

[2] File System

A file system used in this embodiment will be described. This embodiment uses an incremental write file system. An example of the incremental write file system is a file system complying with the universal disk format (UDF). A file system complying with the UDF will be exemplified below as a incremental write file system.

As a characteristic feature of the UDF, a logical sector sequence to write/read data is called an extent, and one file can be divisionally managed in a plurality of extents. The start address of each extent is held as file information and added next to the file entity together with file system information to be updated.

As a file recording schemes, packet-write scheme is used. In UDF, user data contained in one file is divisionally recorded in a plurality of extents. After all extents are recorded, file management information called a file entry information control block (file entry ICB) is additionally recorded to handle the plurality of extents as continuous user data contained in one file. When updating the file, the file entry ICB corresponding to the file is also rewritten.

In the UDF, all files and directories have unique file entry ICBs. The structure of a file entry ICB will be described with reference to FIG. 3. The data structure shown in FIG. 3 can be rewritten to that shown in FIG. 4 by using file entry ICBs. FIG. 4 shows logical block numbers (LBNs), descriptors, and structures sequentially from the left.

Space bitmap descriptors are recorded in LBN=0 to 79. A space bitmap descriptor has a space bitmap indicating whether each physical block can be allocated. A file set descriptor is recorded in LBN=80. The file set descriptor records the position information of the file entry of the root directory. A terminal descriptor is recorded in LBN=81. The terminal descriptor represents the endpoint of the file set descriptor.

The file entry of the root directory is recorded in LBN=82. The file identifier descriptor of the root directory serving as a parent directory and the file identifier descriptors of directories DIR_1 and DIR_2 are recorded in LBN=83. Each file identifier descriptor has information about each file contained in the directory. The main information contained in each file identifier descriptor is the file name of the corresponding file and the position information of the file entry.

To access an arbitrary file, an address at which the file entry ICB of the file is accessed first. The file entry ICB contains at least one file entry. A file entry stores various kinds of attribute information unique to each file and information about the time stamp, file recording position, and file size and is used to manage the file as an extent group. The target file is recorded at the file recording position described in the file entry.

The same structure is formed even for a subdirectory. The address (LBN 83) of the file entry of the root directory is recorded in the ICB (LBN 82) of the root directory. The directory information of the root directory is recorded in an area specified by the address. The directory information represents the addresses (LBNs 84 and 94) of the file entry ICBs of the subdirectories.

The addresses (LBNs 85 and 95) of the file entry ICBs of files in the subdirectories are recorded in the file entry ICBs of the subdirectories. As described above, the address recorded in the file entry ICB of a file describes the file entry of the file. An actual address is specified by referring to it.

The host device 10 controls the memory card 20 by using a file system complying with the UDF. Hence, the flash memory 22 is formatted by the UDF. FIG. 5 is a view illustrating the structure of the storage areas of the memory card 20 recognized by the host device 10 when a file system complying with the UDF is applied to the memory card 20 (e.g., when the flash memory 22 is formatted by the UDF). As shown in FIG. 5, in fact, the host device 10 additionally writes (appends) data in the above-described user data area 31 of the storage areas of the memory card 20.

An incremental write file system sequentially writes files from the lower logical address to upper logical address. When the incremental write file system is applied to the memory card 20, frequent data erasing and writing do not occur in the flash memory 22. This allows efficient file writing and rewriting depending on the application purpose.

When the incremental write file system is applied to the memory card 20, block erasing in file writing is unnecessary. Hence, the file writing speed does not decrease. Since sequential writing is executed, no excess process of the memory card 20 such as a move-write is necessary. Hence, the write process can speed up.

In the UDF, directories and files are indirectly managed by using file identifier descriptors (FIDs), a virtual allocation table (VAT), and file entry ICBs instead of managing them directly by using actual recording positions (logical addresses).

A VAT manages, as a correlation table, logical addresses where files are actually recorded and virtual addresses corresponding to the logical addresses so that the host device can update or read data as if it accessed an arbitrary address on the recording medium in adding data on the medium. In the UDF, sequential numbers (virtual addresses) are allocated to files for virtual reference using the VAT. Directories and files on the recording medium are referred to on the basis of the virtual addresses.

That is, in the UDF, the pieces of position information of the directories and files are referred to indirectly. The VAT can be arranged anywhere in the flash memory 22. The VAT is referred to by a virtual allocation table information control block (VAT ICB) indicating the position of the VAT. In the UDF, the VAT ICB is always located at the end of an additionally written area of a recording medium (flash memory 22 in this embodiment).

For this reason, the host device 10 can convert a virtual address into a logical address by reading the VAT indicated by the VAT ICB first. To access an arbitrary logical address, the host device 10 converts a virtual address into a logical address on the basis of the VAT and accesses the file by using the converted logical address.

The VAT ICB contains the extent list of the VAT that is divisionally arranged in a plurality of extents. In the UDF, therefore, even when a file is changed by some method, it is unnecessary to change the whole series of file pointers. It is possible to arrive at the changed file only by changing the final VAT ICB.

As described above, in the UDF, a VAT is provided between FIDs and file entry ICBs. Even a rewritten file entry ICB can be handled as a virtually rewritten file entry ICB by substituting the address of the file entry ICB on the VAT.

In an incremental write mode, the file entity is appended. Simultaneously, a logical address corresponding to the virtual address of the ICB of the file is changed to change the logical address to be actually accessed. This implements file updating without rewriting already written data.

As shown in FIG. 5, the memory card 20 has a VAT ICB position information area 22B at the lowest logical address in the user data area 31. VAT ICB position information stored in the VAT ICB position information area 22B indicates the recording position (i.e., logical address) of the VAT ICB finally written in the incremental write mode. The host device 10 can recognize the recording position (corresponding to the final data write position) of the finally written VAT ICB by referring to the VAT ICB position information.

The memory card 20 also has a format information area 22A at the highest logical address in the user data area 31. Actually, an area (to be referred to as a file area) to which the user can freely append a file is obtained by excluding the format information area 22A and VAT ICB position information area 22B from the user data area 31.

FIG. 6 is a view illustrating format information stored in the format information area 22A. The format information contains (1) VAT ICB position information acquisition scheme, (2) VAT ICB position information write scheme, (3) VAT ICB position information address 1, (4) VAT ICB position information address 2, (5) physical block size, (6) write boundary unit, (7) VAT ICB position information size, (8) On/off of complete formatting, and (9) fixed data for formatting. These will be described in detail later.

[3] VAT ICB Position Information Recording Operation

An operation of causing the host device 10 to record VAT ICB position information in the memory card 20 will be explained next. There are two VAT ICB position information recording schemes: a fixed position scheme and a regional recordable scheme. The VAT ICB position information recording scheme to be employed and recording position information in each scheme are stored in the format information area 22A in formatting the memory card 20. The host device 10 executes the VAT ICB position information recording operation while referring to the format information stored in the format information area 22A.

[3-1] VAT ICB Position Information Recording Operation by Fixed Position Scheme

Figure 7:
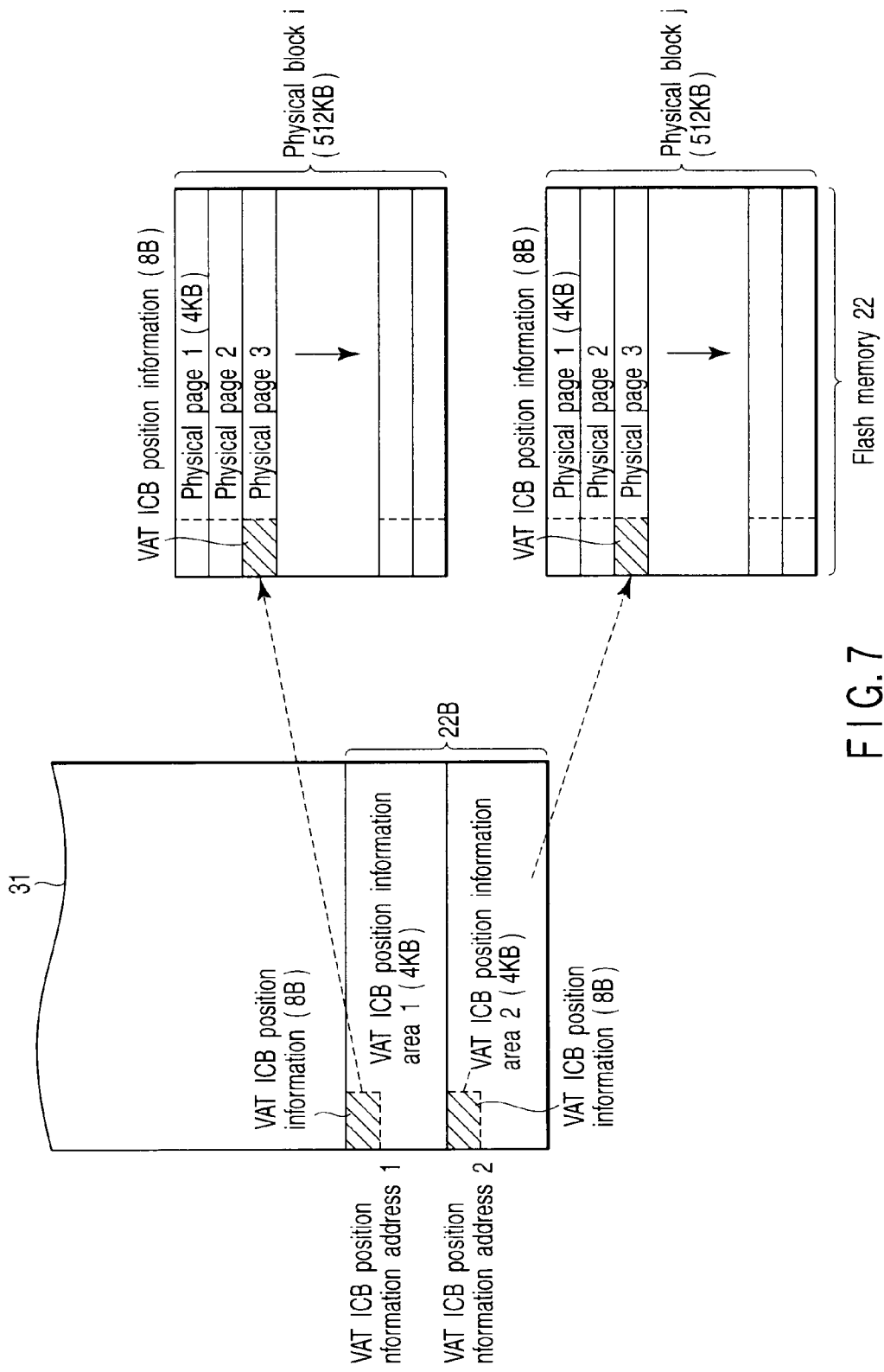
FIG. 7 is a view illustrating the structure of a VAT ICB position information area 22B in a fixed position scheme.

FIG. 7 is a view illustrating the structure of the VAT ICB position information area 22B in the fixed position scheme. The VAT ICB position information area 22B includes two VAT ICB position information areas (VAT ICB position information areas 1 and 2) each having a size of 4 KB. That is, the last 4-KB area of the user data area 31 and an immediately preceding 4-KB area are allocated to VAT ICB position information area 2 and VAT ICB position information area 1, respectively. The packet size in the UDF is 4 KB which corresponds to the physical page size (4 KB).

In this embodiment, VAT ICB position information is duplicated and recorded in VAT ICB position information areas 1 and 2 included in the VAT ICB position information area 22B. Even when one VAT ICB position information is destroyed due to some reason, the other VAT ICB position information is usable.

One VAT ICB position information is stored in an 8-byte area corresponding to the first logical address (VAT ICB position information address 1 in FIG. 6) of VAT ICB position information area 1. Similarly, the other VAT ICB position information is stored in an 8-byte area corresponding to the first logical address (VAT ICB position information address 2 in FIG. 6) of VAT ICB position information area 2.

Figure 8:
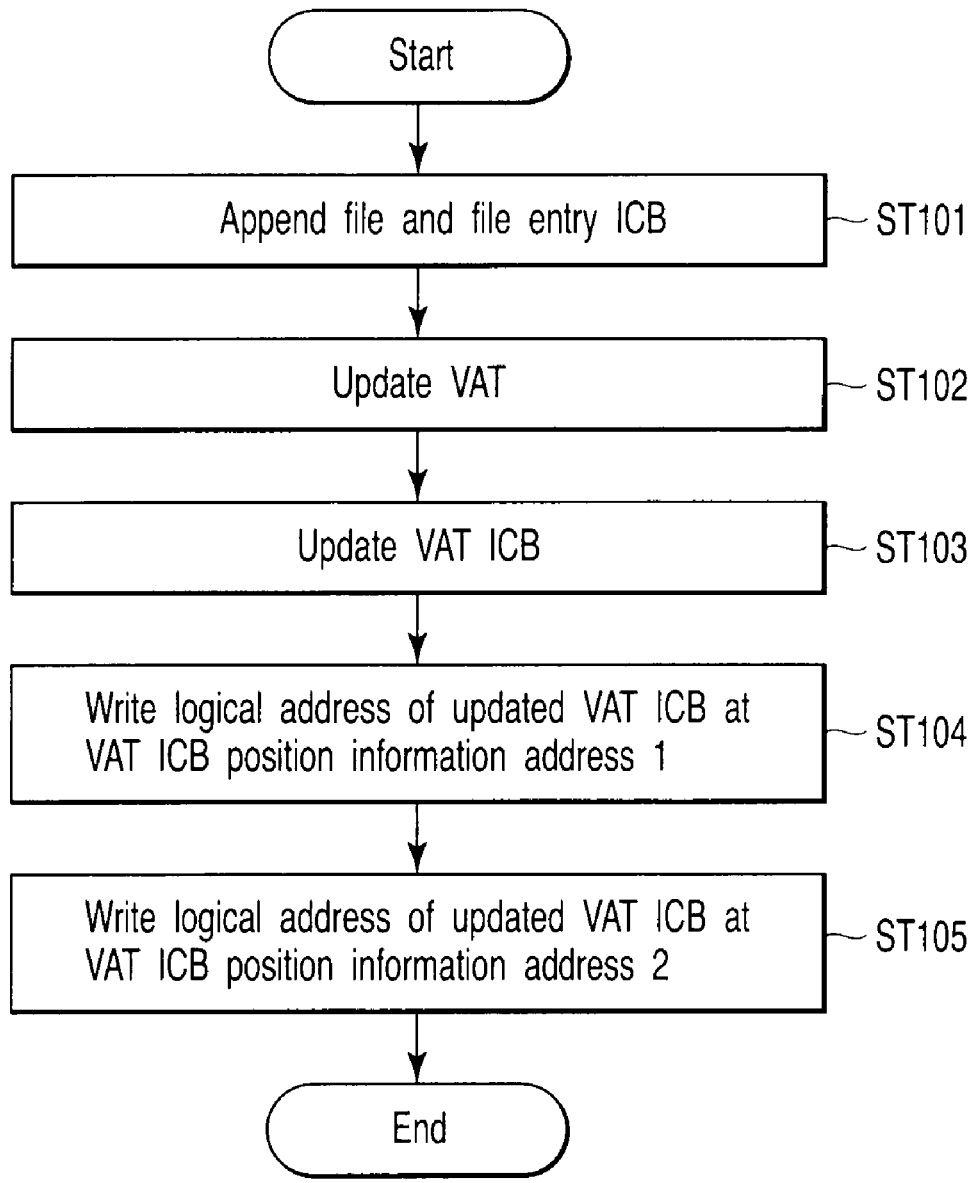
FIG. 8 is a flowchart illustrating the incremental write operation of the host device 10 in a fixed position scheme.

The incremental write operation of the host device 10 in the fixed position scheme will be described next. FIG. 8 is a flowchart illustrating the incremental write operation of the host device 10 in the fixed position scheme.

The host device 10 appends a file and a file entry ICB corresponding to the file next to an additionally written area (step ST101). The host device 10 updates (appends) the VAT (step ST102). The host device 10 updates (appends) the VAT ICB (step ST103).

Next, the host device 10 writes the logical address (corresponding to 8-byte VAT ICB position information) of the updated VAT ICB at VAT ICB position information address 1 (step ST104). The host device 10 writes the logical address of the updated VAT ICB at VAT ICB position information address 2 (step ST105). In this way, the VAT ICB position information is stored in the two VAT ICB position information areas (VAT ICB position information areas 1 and 2) of the VAT ICB position information area 22B.

In the fixed position scheme, the process of the host device 10 is easy because the pieces of VAT ICB position information at identical logical addresses (VAT ICB position information addresses 1 and 2) are updated. In the memory card 20, however, the VAT ICB position information is overwritten in the same area. That is, the memory card 20 executes a move-write, i.e., writes new data to rewrite old data in a new erased block and copies unrewritten data from the old block containing the old data (data to be rewritten to the new data) to the new block.

If a write of a predetermined size (8 bytes in this embodiment) for the same logical address repeatedly occurs, the controller 21 appends data in the physical blocks of the flash memory 22 (high-speed write at the same logical address), as shown in FIG. 7.

More specifically, data are sequentially appended to the physical pages in a physical block i corresponding to VAT ICB position information area 1. FIG. 7 shows an example wherein the latest VAT ICB position information is recorded in physical page 3 in the physical block i (i.e., the VAT ICB position information is updated twice). When the physical block i has filled, another physical block is allocated, or the same physical block i is erased and used. The same operation is executed even for a physical block j corresponding to VAT ICB position information area 2.

With this arrangement, even when VAT ICB position information is written at the same logical address, it is unnecessary to erase the block or allocate a new block every time. Consequently, the memory card 20 can efficiently update the VAT ICB position information at high speed.

Figure 9:
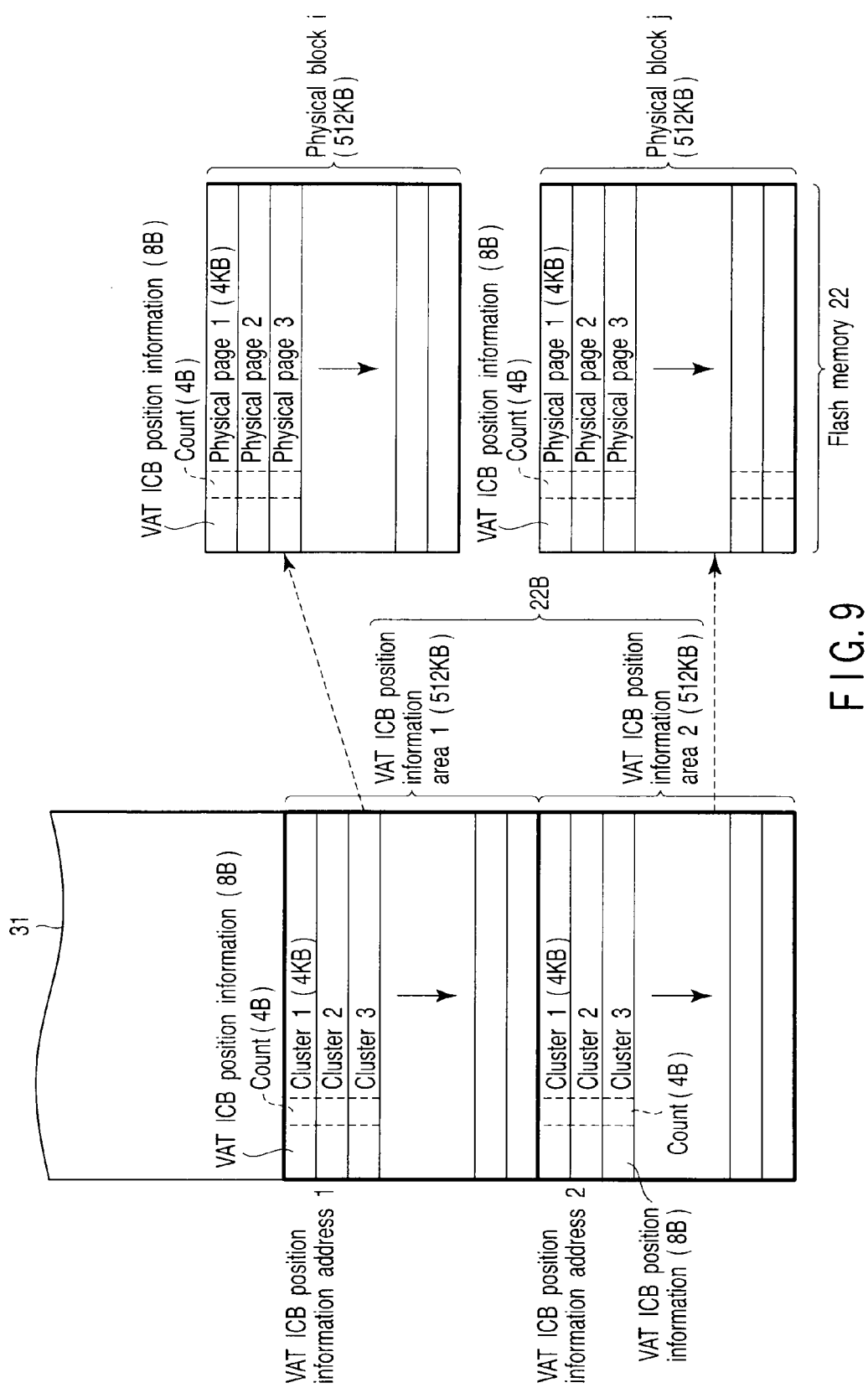
FIG. 9 is a view illustrating the structure of the VAT ICB position information area 22B in a regional recordable scheme.

[3-2] VAT ICB Position Information Recording Operation by Regional Recordable Scheme FIG. 9 is a view illustrating the structure of the VAT ICB position information area 22B in the regional recordable scheme. The VAT ICB position information area 22B includes two VAT ICB position information areas (VAT ICB position information areas 1 and 2) each having a size of 512 KB. That is, the last 512-KB area of the user data area 31 and an immediately preceding 512-KB area are allocated to VAT ICB position information area 2 and VAT ICB position information area 1, respectively.

In this embodiment, the size of VAT ICB position information area 1 (or VAT ICB position information area 2) corresponds to the physical block size (512 KB) of the flash memory 22. VAT ICB position information area 1 (or VAT ICB position information area 2) includes a plurality of clusters each having a size of 4 KB. More specifically, the size (4 KB) of each cluster corresponds to the boundary (to be referred to as a write boundary unit) in sequentially writing updated VAT ICB position information in VAT ICB position information area 1 (or VAT ICB position information area 2). The packet size in the UDF is 4 KB which corresponds to the physical page size (4 KB).

VAT ICB position information is duplicated and recorded in VAT ICB position information areas 1 and 2 included in the VAT ICB position information area 22B. Even when one VAT ICB position information is destroyed due to some reason, the other VAT ICB position information is usable.

One VAT ICB position information is stored in an 8-byte area corresponding to the first logical address of each cluster in VAT ICB position information area 1. The first logical address of the first cluster (corresponding to cluster 1) in VAT ICB position information area 1 corresponds to VAT ICB position information address 1. Each cluster has a 4-byte area to store a count next to the 8-byte area to store VAT ICB position information. Values sequentially incremented by one from, e.g., 1 are stored as counts sequentially from cluster 1 to higher cluster.

That is, the count is set to a value obtained by incrementing, by one, a count that is written simultaneously with the immediately preceding VAT ICB position information. The count returns from 0xFFFFFFFF to 0x00000000. The host device 10 can recognize the finally written VAT ICB position information by referring to the 4-byte area that stores the count.

Similarly, the other VAT ICB position information is stored in an 8-byte area corresponding to the first logical address (VAT ICB position information address 2) of each cluster in VAT ICB position information area 2. Each cluster in VAT ICB position information area 2 stores a count in a 4-byte area next to the 8-byte area to store VAT ICB position information. The first logical address of the first cluster (corresponding to cluster 1) in VAT ICB position information area 2 corresponds to VAT ICB position information address 2.

Figure 10:
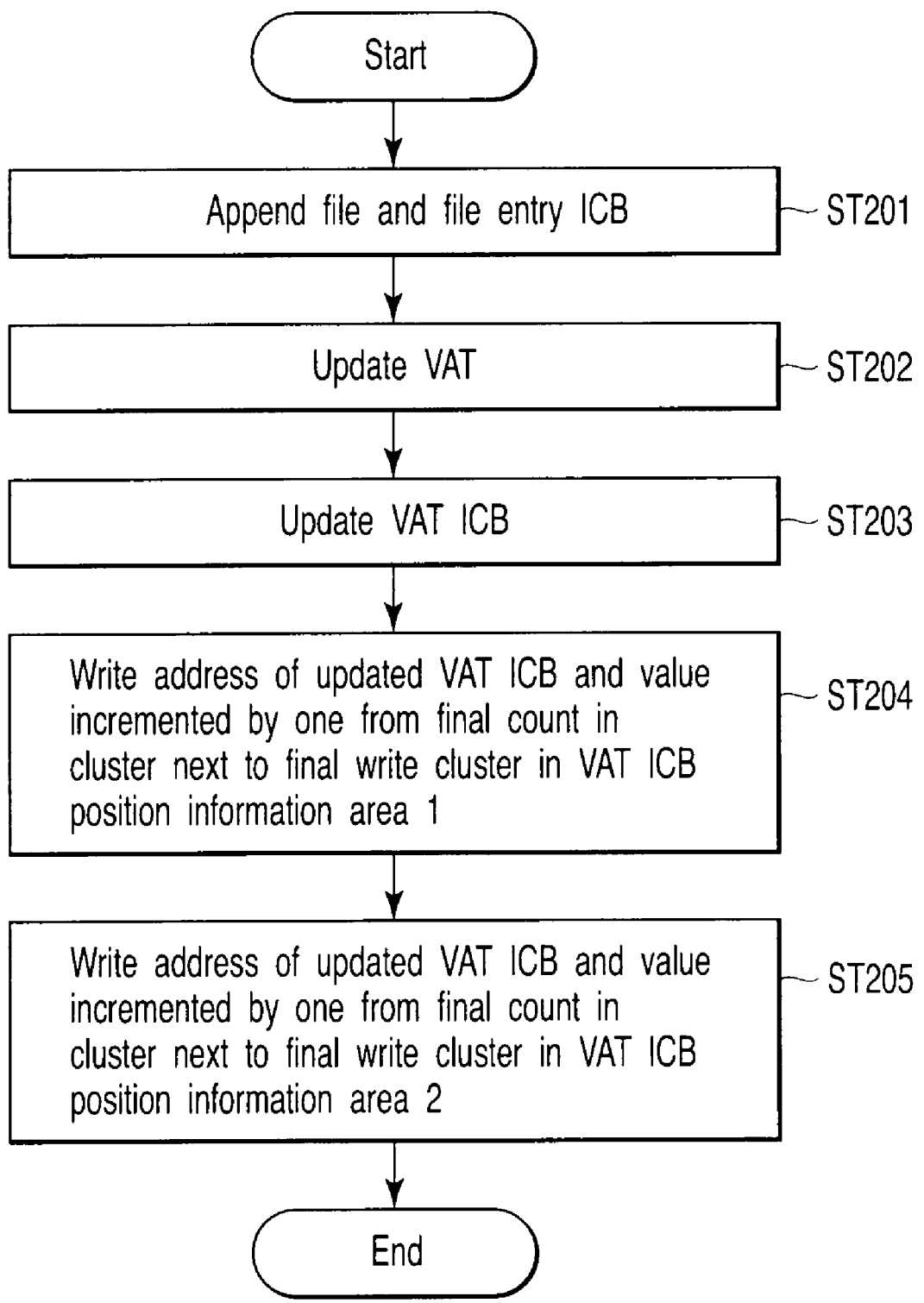
FIG. 10 is a flowchart illustrating the incremental write operation of the host device 10 in a regional recordable scheme.

The incremental write operation of the host device 10 in the regional recordable scheme will be described next. FIG. 10 is a flowchart illustrating the incremental write operation of the host device 10 in the regional recordable scheme.

The host device 10 adds a file and a file entry ICB corresponding to the file next to an additionally written area (step ST201). The host device 10 updates (appends) the VAT (step ST202). The host device 10 updates (appends) the VAT ICB (step ST203).

Next, the host device 10 writes the logical address (corresponding to 8-byte VAT ICB position information) of the updated VAT ICB and a value incremented by one from the final count in a cluster next to a finally written cluster in VAT ICB position information area 1 (step ST204). More specifically, the host device 10 writes VAT ICB position information in the first 8-byte area of the cluster. The host device 10 then writes the count in the 4-byte area next to the VAT ICB position information.

The host device 10 writes the logical address of the updated VAT ICB and a value incremented by one from the final count in a cluster next to a finally written cluster in VAT ICB position information area 2 (step ST205). In this way, the VAT ICB position information and count are stored in the two VAT ICB position information areas (VAT ICB position information areas 1 and 2) of the VAT ICB position information area 22B.

In the regional recordable scheme, the process of the host device 10 is complex. However, since the size of the VAT ICB position information area is made to match the physical block size of the flash memory 22, and the write boundary unit is made to match the physical page size of the flash memory 22, it is unnecessary to erase a physical block or allocate a new physical block every time VAT ICB position information is to be written. This enables efficient writing of VAT ICB position information.

[4] Logical Formatting of Memory Card 20

To apply this embodiment to the memory card 20, the host device 10 logically formats the memory card 20. In logical formatting of the memory card 20, the host device 10 writes format parameters corresponding to the characteristic of the memory card 20 in the format information area 22A at the start of the user data area 31. After formatting, the host device 10 updates VAT ICB position information or searches for a VAT ICB on the basis of the format information parameters.

Additionally, the host device 10 executes complete formatting of the memory card 20. As will be described later, the VAT ICB searched by the host device 10 on the basis of VAT ICB position information may not have a valid data format defined by the UDF. To allow the host device 10 to acquire the VAT ICB even in such case, the host device 10 executes a process (complete formatting) of filling the user data area 31 of the memory card 20 with fixed data for formatting.

Some of a plurality of kinds of memory cards can use an erase command to erase data. For a memory card capable of using an erase command, the host device 10 erases data in the user data area 31 by using an erase command. In SD™ cards as a kind of memory card, whether all bits of data (to be referred to as fixed data) after erase are "0" or "1" is determined in advance for each card. The host device 10 can confirm the fixed data by using a command.

For a memory card incapable of using an erase command, the host device 10 first asks the user and confirms whether to execute complete formatting. This is because if no erase command is usable, the host device 10 writes fixed data for formatting in the whole user data area 31 by a normal time-consuming write operation. In this embodiment, when the user selects complete formatting, the host device 10 writes fixed data for formatting in the user data area 31.

Figure 11:
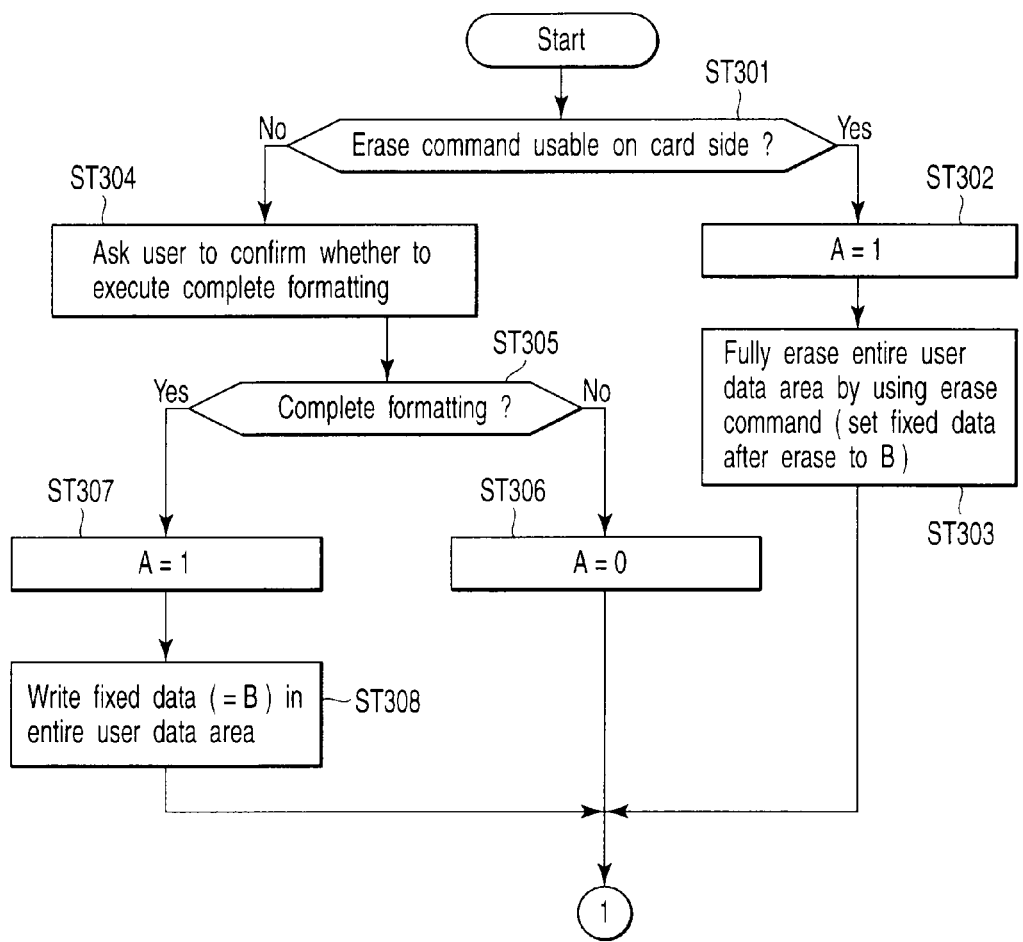
FIG. 11 is a flowchart illustrating the formatting operation of the host device 10.

FIGS. 11 and 12 are flowcharts illustrating the formatting operation of the host device 10. The host device 10 determines whether the memory card 20 can use an erase command (step ST301). If an erase command is usable, the host device 10 sets an internal variable A=1 (step ST302) and fully erases data in the user data area 31 by using an erase command (step ST303). At this time, the host device 10 sets data (fixed data for formatting) after erase to an internal variable B. Then, the host device 10 advances to step ST309.

If no erase command is usable in step ST301, the host device 10 asks the user and confirms whether to execute complete formatting (step ST304). If complete formatting is not to be executed, the host device 10 sets the internal variable A=0 (step ST306) and advances to step ST309.

If it is determined in step ST305 that complete formatting should be executed, the host device 10 sets the internal variable A=1 (step ST307) and writes fixed data for formatting in the entire user data area 31 (step ST308). At this time, the host device 10 sets data (fixed data for formatting) after erase to the internal variable B.

The host device 10 determines whether a dedicated interface scheme to the memory card 20 is usable to acquire VAT ICB position information (step ST309). An example of the dedicated interface scheme is described in second and third embodiments. If the dedicated interface scheme is usable, the host device 10 acquires a VAT ICB by using the dedicated interface scheme from then. Hence, the host device 10 sets the internal variable A=1 and D to I=0 (step ST310) and advances to step ST324.

If no dedicated interface scheme is usable in step ST309, the host device 10 sets an internal variable C=0. As described above, the host device 10 determines whether the memory card 20 supports "high-speed writing at the same logical address" (step ST312). If the memory card 20 supports high-speed writing at the same logical address, the host device 10 sets an internal variable D=0 (step ST313) and executes settings for "[3-1] VAT ICB position information recording operation by fixed position scheme" described above.

More specifically, the host device 10 sets the final logical address of the user data area 31 to an internal variable E to set, as VAT ICB position information address 1, a logical address obtained by subtracting 8 KB (corresponding to the size of the VAT ICB position information area 22B) from the final logical address of the user data area 31 (step ST314). Next, the host device 10 sets the final logical address of the user data area 31 to an internal variable F to set, as VAT ICB position information address 2, a logical address obtained by subtracting 4 KB (corresponding to the size of VAT ICB position information area 2) from the final logical address of the user data area 31 (step ST315).

The host device 10 sets an internal variable G=0 and an internal variable H=0 (steps ST316 and ST317). The host device 10 sets the size of VAT ICB position information. In this embodiment, since the size of VAT ICB position information is 8 bytes, the host device 10 sets an internal variable I=8 (step ST318).

If it is determined in step ST312 that the memory card 20 does not support high-speed writing at the same logical address, the host device 10 sets the internal variable D=1 (step ST319) and executes settings for "[3-2] VAT ICB position information recording operation by regional recordable scheme" described above.

More specifically, the host device 10 sets the final logical address of the user data area 31 to the internal variable E to set, as VAT ICB position information address 1, a logical address obtained by subtracting "physical block size×2" (corresponding to the size of the VAT ICB position information area 22B) from the final logical address of the user data area 31 (step ST320). Next, the host device 10 sets the final logical address of the user data area 31 to the internal variable F to set, as VAT ICB position information address 2, a logical address obtained by subtracting the physical block size (corresponding to the size of VAT ICB position information area 2) from the final logical address of the user data area 31 (step ST321).

The host device 10 sets the physical block size corresponding to the size of VAT ICB position information area 1 (or VAT ICB position information area 2) to the internal variable G (step ST322). The host device 10 sets a physical page size corresponding to the write boundary unit (cluster size) to the internal variable H (step ST323). The host device 10 sets the size of VAT ICB position information (step ST318).

The host device 10 writes (1)=C, (2)=D, (3)=E, (4)=F, (5)=G, (6)=H, (7)=I, (8)=A, (9)=B in the format information area 22A as format information (FIG. 6). Logical formatting of the memory card 20 is done in this way.

[5] VAT ICB Acquiring Operation

Figure 13:
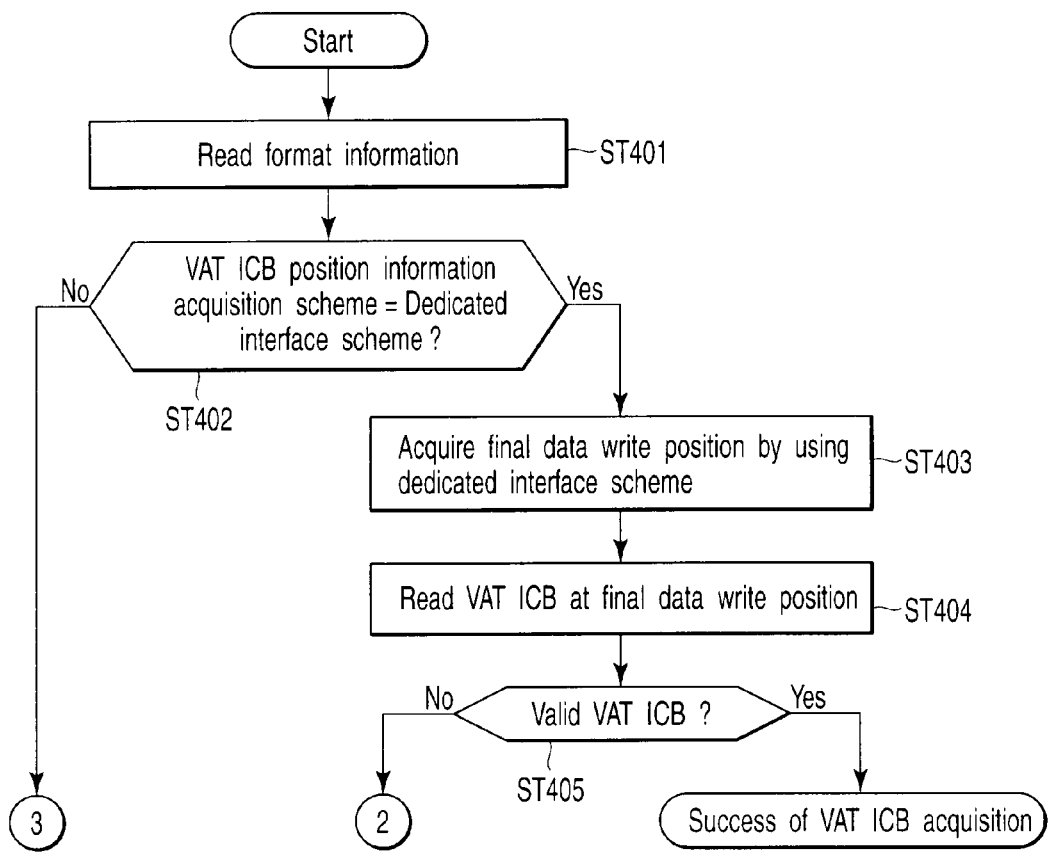
FIG. 13 is a flowchart illustrating the VAT ICB acquiring operation of the host device 10.
Figure 14:
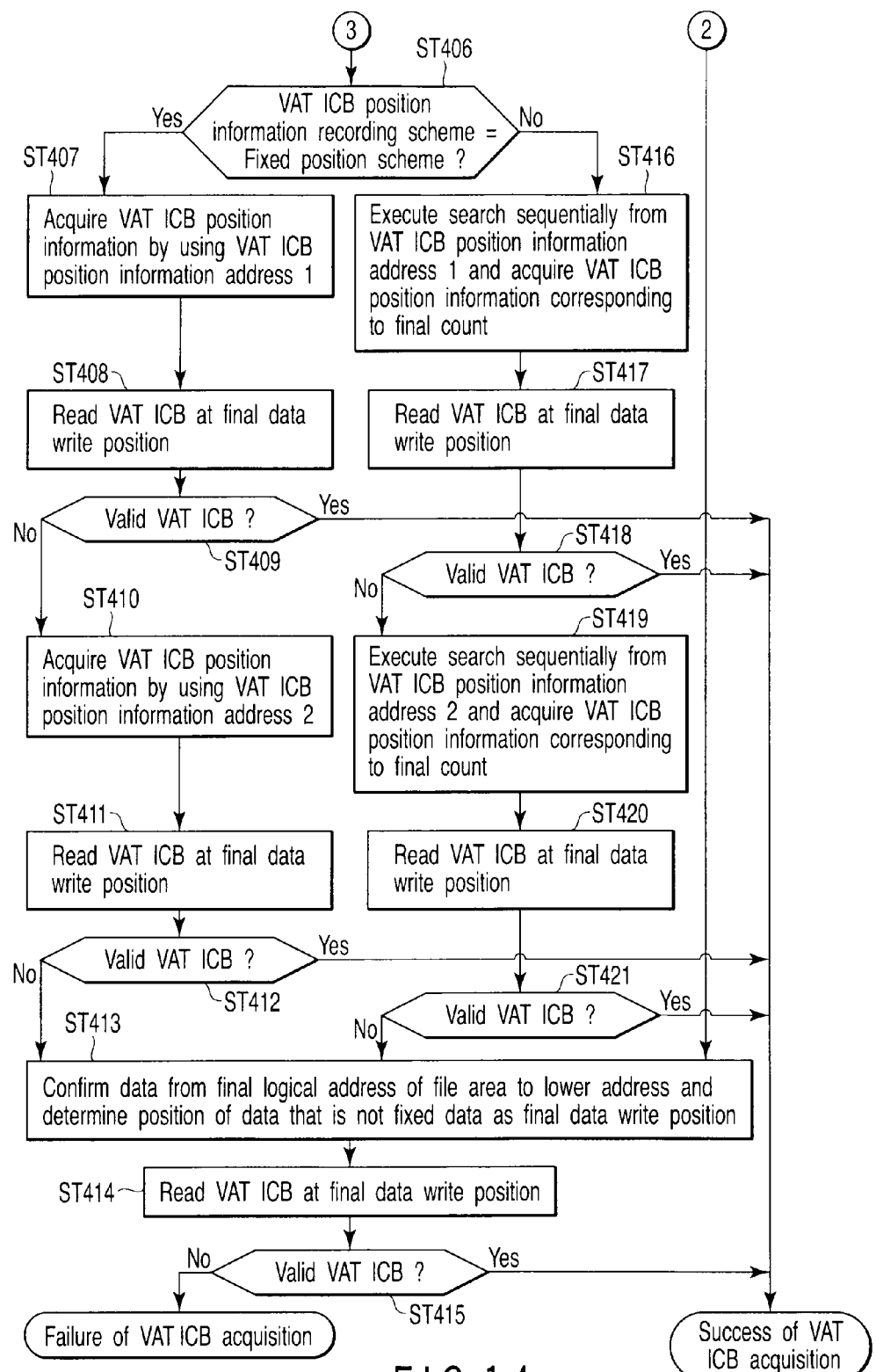
FIG. 14 is a flowchart illustrating the VAT ICB acquiring operation of the host device 10 following FIG. 13.

An operation of causing the host device 10 to acquire a VAT ICB recorded in the memory card 20 will be described next. The host device 10 executes the VAT ICB acquiring operation by using format information written in the memory card 20 upon logical formatting of it. FIGS. 13 and 14 are flowcharts illustrating the VAT ICB acquiring operation of the host device 10.

First, the host device 10 reads format information from the format information area 22A (step ST401). The host device 10 determines on the basis of the contents of the format information (format information (1)) whether the VAT ICB position information acquisition scheme is a dedicated interface scheme (step ST402).

If the scheme is a dedicated interface scheme, the host device 10 acquires the final data write position (i.e., the position of final data in the additionally written area) by using the dedicated interface scheme (step ST403). Next, the host device 10 reads the VAT ICB stored at the final data write position (step ST404).

The host device 10 confirms the read VAT ICB and determines whether it is a valid VAT ICB complying with a format defined by the UDF (step ST405). If the VAT ICB is valid, VAT ICB acquisition has succeeded. The host device 10 accesses a file by using the VAT ICB. If the VAT ICB is not valid in step ST405, the host device 10 advances to step ST413.

If the scheme is not a dedicated interface scheme in step ST402, the host device 10 determines on the basis of the format information whether the VAT ICB position information recording scheme is a fixed position scheme (step ST406). If the scheme is a fixed position scheme, the host device 10 then executes the VAT ICB acquiring operation by the fixed position scheme.

More specifically, by using VAT ICB position information address 1 contained in the format information, the host device 10 acquires VAT ICB position information corresponding to this address (step ST407). The host device 10 reads the VAT ICB stored at the final data write position by using the VAT ICB position information (step ST408). The host device 10 confirms the read VAT ICB and determines whether it is a valid VAT ICB complying with a format defined by the UDF (step ST409). If the VAT ICB is valid, VAT ICB acquisition has succeeded. The host device 10 accesses a file by using the VAT ICB.

If the VAT ICB is not valid in step ST409, by using VAT ICB position information address 2 contained in the format information, the host device 10 acquires VAT ICB position information corresponding to this address (step ST410). The host device 10 reads the VAT ICB stored at the final data write position by using the VAT ICB position information (step ST411). The host device 10 confirms the read VAT ICB and determines whether it is a valid VAT ICB complying with a format defined by the UDF (step ST412). If the VAT ICB is valid, VAT ICB acquisition has succeeded. The host device 10 accesses a file by using the VAT ICB.

If the VAT ICB is not valid in step ST412, the host device 10 determines that the VAT ICB position information stored in the VAT ICB position information area 22B is destroyed due to some reason and executes the VAT ICB acquiring operation by another method. More specifically, the host device 10 sequentially confirms data from the final logical address of the file area in the user data area 31 to the lower address. Upon confirming data that is not the fixed data used in complete formatting, the host device 10 determines the position of the data as the final data write position (step ST413).

The host device 10 reads the VAT ICB stored at the final data write position (step ST414). The host device 10 confirms the read VAT ICB and determines whether it is a valid VAT ICB complying with a format defined by the UDF (step ST415). If the VAT ICB is valid, VAT ICB acquisition has succeeded. The host device 10 accesses a file by using the VAT ICB. If the VAT ICB is not valid, the host device 10 determines that VAT ICB acquisition has failed.

If the scheme is not a fixed position scheme in step ST406, the host device 10 then executes the VAT ICB acquiring operation by the regional recordable scheme.

By using VAT ICB position information address 1 contained in the format information, the host device 10 confirms counts stored in the clusters in VAT ICB position information area 1 sequentially from VAT ICB position information address 1. At this time, the host device 10 recognizes the cluster size by referring to the write boundary unit contained in the format information. The host device 10 also recognizes the size of VAT ICB position information area 1 by referring to the physical block size contained in the format information. The host device 10 acquires VAT ICB position information in the cluster where the final count is stored (step ST416).

The host device 10 reads the VAT ICB stored at the final data write position by using the VAT ICB position information (step ST417). The host device 10 confirms the read VAT ICB and determines whether it is a valid VAT ICB complying with a format defined by the UDF (step ST418). If the VAT ICB is valid, VAT ICB acquisition has succeeded. The host device 10 accesses a file by using the VAT ICB.

If the VAT ICB is not valid in step ST418, by using VAT ICB position information address 2 contained in the format information, the host device 10 confirms counts stored in the clusters in VAT ICB position information area 2 sequentially from VAT ICB position information address 2. At this time, the host device 10 recognizes the cluster size by referring to the write boundary unit contained in the format information. The host device 10 also recognizes the size of VAT ICB position information area 2 by referring to the physical block size contained in the format information. The host device 10 acquires VAT ICB position information in the cluster where the final count is stored (step ST419).

The host device 10 reads the VAT ICB stored at the final data write position by using the VAT ICB position information (step ST420). The host device 10 confirms the read VAT ICB and determines whether it is a valid VAT ICB complying with a format defined by the UDF (step ST421). If the VAT ICB is valid, VAT ICB acquisition has succeeded. The host device 10 accesses a file by using the VAT ICB.

If the VAT ICB is not valid in step ST421, the host device 10 determines that the VAT ICB position information stored in the VAT ICB position information area 22B is destroyed due to some reason and executes steps ST413 to ST415 described above. In this way, the host device 10 executes the VAT ICB acquiring operation.

As described above in detail, according to this embodiment, it is possible to apply an incremental write file system to a memory card including a NAND flash memory. This eliminates frequent data erasing and rewriting in the flash memory 22 and consequently allows efficient file writing and rewriting.

In logical formatting of the memory card 20, management information (e.g., VAT ICB position information address and VAT ICB position information size) about VAT ICB position information can be stored in the memory card 20 as format information. This makes it possible to easily acquire a VAT ICB.

VAT ICB position information is duplicated and stored in the VAT ICB position information area 22B in preparation for data destruction. This further raises the probability of VAT ICB acquisition.

Even when VAT ICB acquisition using VAT ICB position information stored in the VAT ICB position information area 22B has failed, the final data write position can be detected by using fixed data upon formatting. Since this further increases the probability of VAT ICB acquisition, a reliable VAT ICE acquisition scheme can be provided.

In this embodiment, a file system complying with the UDF is applied to the user data area 31. If the protected data area 34 is also managed by a similar scheme, the scheme of this embodiment is applicable to the protected data area 34.

Figure 15:
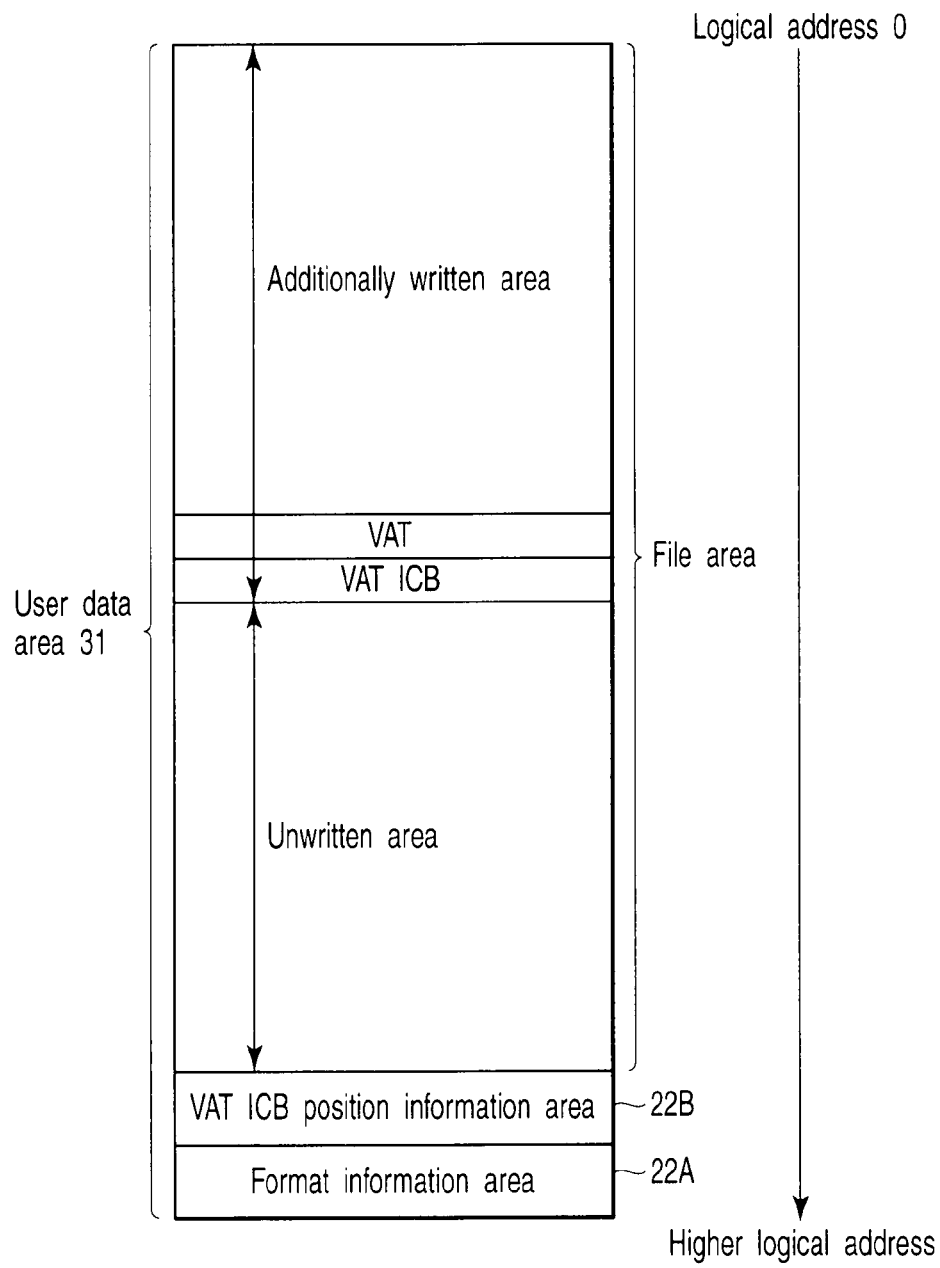
FIG. 15 is a view illustrating the structure of the storage areas of the memory card 20 so as to explain the position of the format information area 22A.

In this embodiment, the format information area 22A is provided at the highest logical address in the user data area 31. However, the present invention is not limited to this. The format information area 22A may be provided at the lowest logical address in the user data area 31. FIG. 15 is a view illustrating the structure of the storage areas of the memory card 20 so as to explain the position of the format information area 22A.

As shown in FIG. 15, the memory card 20 has the format information area 22A at the lowest logical address in the user data area 31. The contents of the format information area 22A are the same as in FIG. 6.

The memory card 20 has the VAT ICB position information area 22B above the format information area 22A in the user data area 31 (i.e., at the logical address immediately preceding to the format information area 22A). The VAT ICB position information area 22B stores VAT ICB position information. The structure of the VAT ICB position information area 22B is the same as in FIG. 7 or 9.

Even in the memory card 20 with the arrangement shown in FIG. 15, the same operations as described above can be implemented except that the logical addresses of format information and VAT ICB position information written by the host device 10 change. Additionally, the same effect as described above can be obtained.

Second Embodiment

Figure 16:
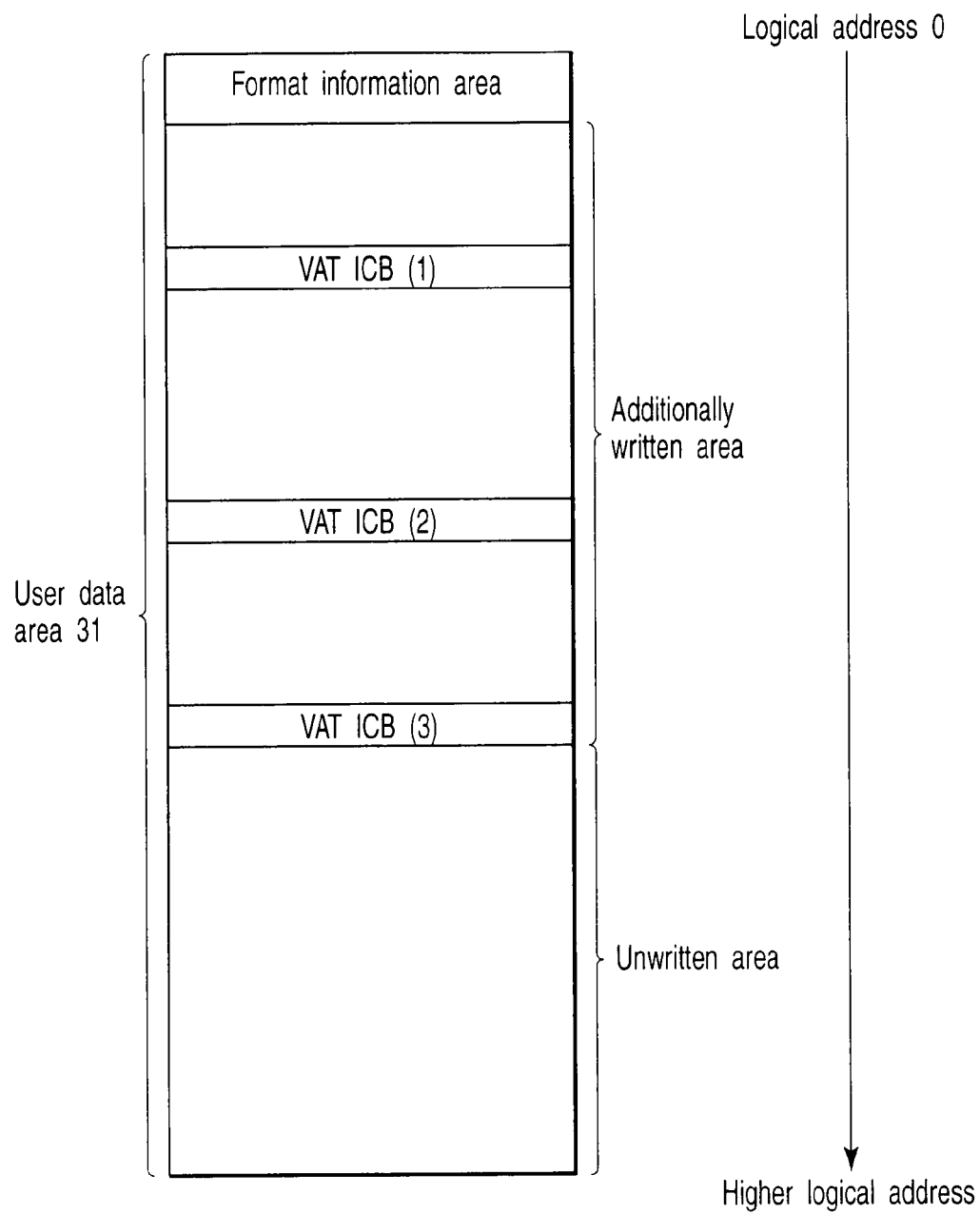
FIG. 16 is a view illustrating the structure of a user data area 31 recognized by a host device 10 according to the second embodiment of the present invention.

FIG. 16 is a view illustrating the structure of a user data area 31 recognized by a host device 10 when a file system complying with the UDF is applied to a memory card 20 (i.e., when a flash memory 22 is formatted by the UDF). As shown in FIG. 16, the host device 10 appends data to the above-described user data area 31 of the storage areas of the memory card 20.

When the host device 10 writes data in the memory card 20 by the UDF, data are sequentially written as packets from the lower address to the higher address of the user data area 31 on the side of the memory card 20. Every time a file is updated, the VAT is updated, and the updated VAT ICB is written at the final write position. To access a written file, the host device 10 must confirm the position where the VAT ICB is written and read the VAT ICB.

When a file is repeatedly updated, a plurality of VAT ICBs are created in the user data area 31. In the example shown in FIG. 16, a file is updated twice, and accordingly, three VAT ICBs (VAT ICB (1) to VAT ICB (3)) are written.

To normally access all written files, the latest VAT ICB write needs to have finished normally. However, if the memory card 20 is removed from the host device 10, or the host device 10 is powered off forcibly during file writing, the VAT ICB write cannot normally finish so the host device 10 cannot read the latest VAT ICB. This may impede access to all written files in the memory card 20.

If the host device 10 can know the position information of VAT ICBs written in the past, the host device 10 can read them and also read at least files written so far. To do this, the host device 10 must have a function of reading VAT ICB position information in the past from the memory card 20. This embodiment allows the host device 10 to read at least files written up to a certain point of time by enabling search of VAT ICBs that are normally written in the past.

Figure 17:
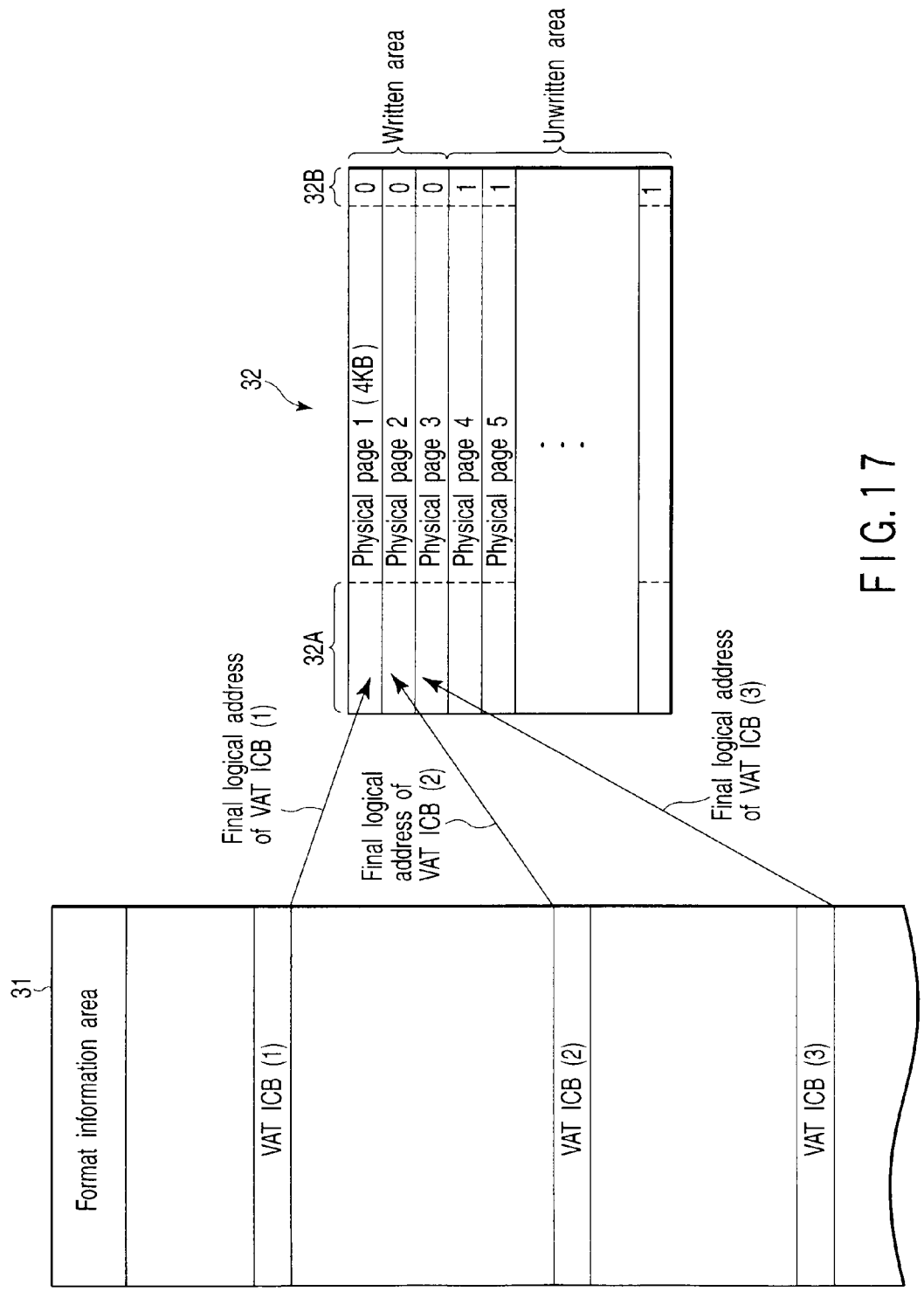
FIG. 17 is a view illustrating the structure of a management data area 32.

FIG. 17 is a view illustrating the structure of a management data area 32. In this embodiment, address information to be used for search of a VAT ICB that is normally written in the past is stored in the management data area 32 of the NAND flash memory 22. The management data area 32 mainly stores management information about the memory card 20. The management data area 32 normally stores security information and card information such as a medium ID of the memory card 20.

The management data area 32 includes a plurality of physical blocks. One or a plurality of physical blocks of the management data area 32 store address information to be used to search for a VAT ICB. Each physical page of the physical block has a final address area 32A and a write information area 32B. The final address area 32A stores the final logical address of the VAT ICB written in the user data area 31.

As the write information area 32B, for example, the redundant area of each physical page is used. The write information area 32B stores a flag representing "written" or "unwritten" in the physical page of the management data area 32. The host device 10 can recognize the physical page of the final write area of the physical blocks of the management data area 32 by confirming the flag. For example, a physical page in the management data area 32 is set to 4 Kbytes, the final address area 32A is set to 8 bytes, and the write information area 32B is set to 1 bit.

Figure 18:
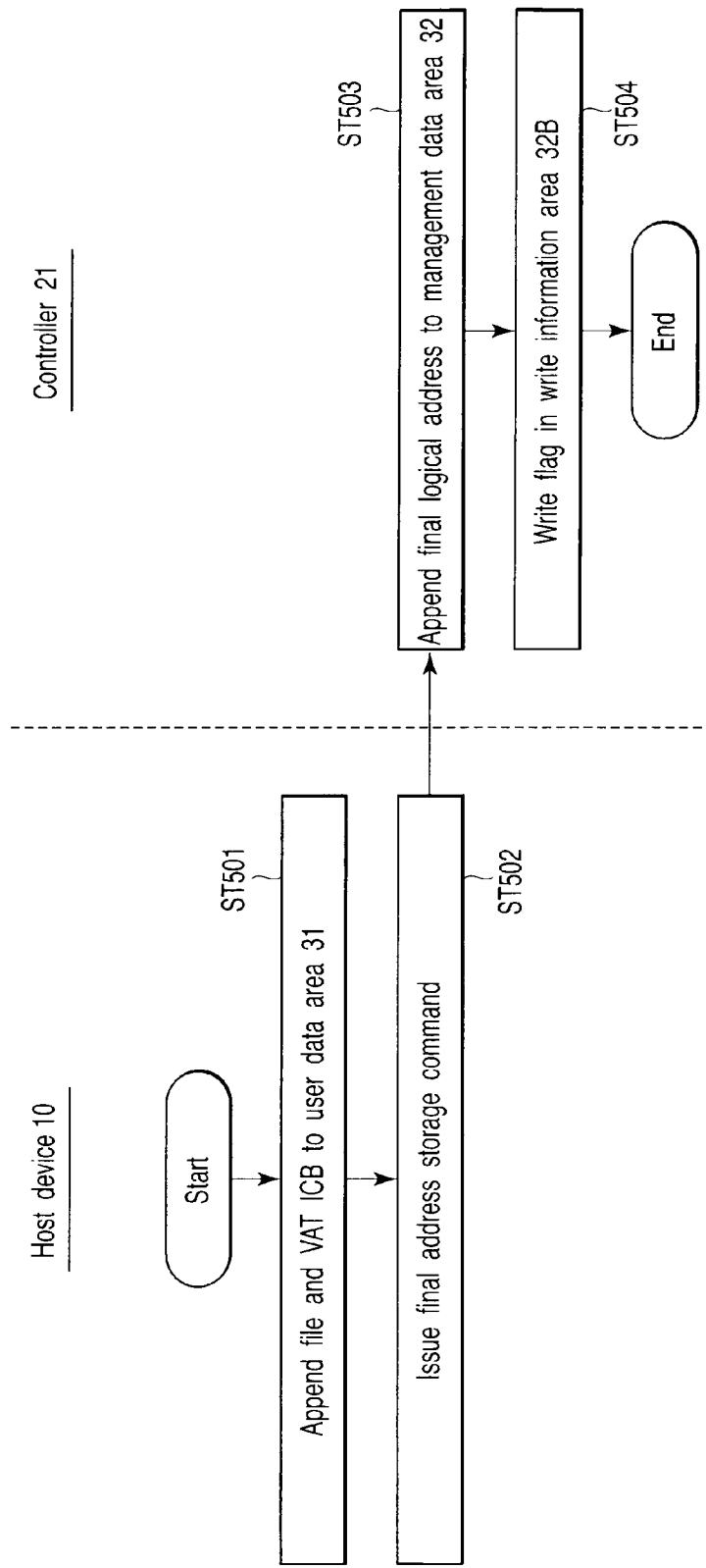
FIG. 18 is a flowchart illustrating the VAT ICB final logical address write operation of the host device 10 and a controller 21.

The operations of the host device 10 and memory card 20 having the above-described arrangement will be described. FIG. 18 is a flowchart illustrating the VAT ICB final logical address write operation of the host device 10 and a controller 21.

The host device 10 appends one file to the user data area 31 of the memory card 20 and writes a VAT ICB at the end of the additionally written area (step ST501). The host device 10 issues a final address storage command to the memory card 20 (step ST502).

Upon receiving the final address storage command, the controller 21 appends the final logical address (corresponding to the final logical address of the VAT ICB written in step ST501) where data is finally written to the final address area 32A in the management data area 32 (step ST503). The controller 21 also writes a flag "0" representing "written" in the write information area 32B of the same physical page as the final logical address written in step ST503 (step ST504).

In this way, the final logical address of the VAT ICB can be written in the management data area 32. If the next file is appended to the memory card 20, a final logical address and flag are appended to the management data area 32 by repeating the operation shown in FIG. 18. If the currently used physical block has filled, data in a new physical block of the management data area 32 is erased, and a final logical address and flag are sequentially appended to the new physical block. Then, the two physical blocks (or two or more physical blocks) are repeatedly used in order.

A VAT ICB read operation will be described next. The host device 10 issues a final address read command to the memory card 20 while setting a command parameter to n (n is an integer, n≧0).

Upon receiving the final address read command, the controller 21 reads the final logical address stored in the nth preceding page from the final write page of the management data area 32. The controller 21 sends the final logical address to the host device 10.

Upon receiving the final logical address, the host device 10 can acquire the VAT ICB by using the final logical address. The host device 10 can also access a desired file by using the VAT ICB.

As described above in detail, in this embodiment, every time a file is updated, VAT ICB position information is appended to the final address area 32A in the management data area 32. That is, the memory card 20 stores, in the management data area 32, the position information of all VAT ICBs that are written in the past.

Hence, according to this embodiment, the host device 10 can acquire the position information of a VAT ICB written in the past by issuing a final address read command. Even when the memory card 20 is removed from the host device 10 during data writing, it is possible to trace the VAT ICB for each file and minimize the number of inaccessible files.

Third Embodiment

In the third embodiment, a flag is written in the redundant area of a user data area 31. VAT ICB position information is acquired by using the flag. That is, it is possible to acquire VAT ICB position information by using not a management data area 32 but only the user data area 31.

Figure 19:
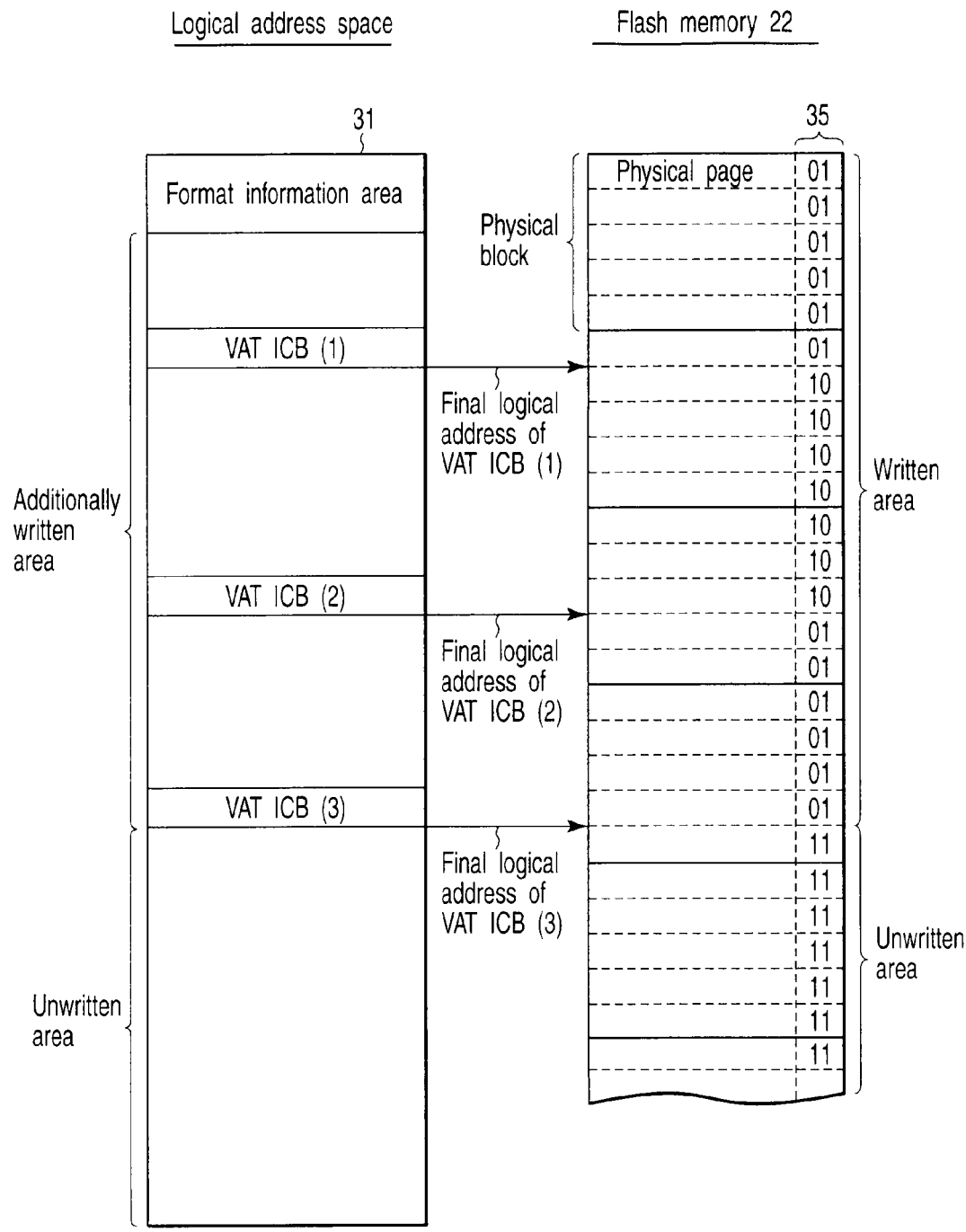
FIG. 19 is a view illustrating the structure of the physical blocks of a NAND flash memory 22 according to the third embodiment of the present invention.

FIG. 19 is a view illustrating the structure of the physical blocks of a NAND flash memory 22. For easy understanding of the invention, the number of physical pages included in a physical block in FIG. 19 is smaller than actual. In this embodiment, the user data area 31 in the NAND flash memory 22 stores the flag to be used for searching for a VAT ICB that is normally written in the past.

Each physical page included in a plurality of physical blocks corresponding to the user data area 31 has a redundant area 35. Part (e.g., 2 bits in this embodiment) of the redundant area 35 stores a flag representing "written" or "unwritten". There are prepared three kinds of flags: a flag ("11") representing "unwritten" and two flags ("01" and "10") representing "written".

When a controller 21 confirms the flag, the position of the final write area in the user data area 31 or the position of the final write area of each file can be recognized. In addition, a host device 10 can read a VAT ICB written at the logical address of the final write area position of each file by recognizing the address.

The operations of the host device 10 and a memory card 20 having the above-described arrangement will be described. The host device 10 issues an erase command to the memory card 20 in formatting it to set the user data area 31 in an erased state ("1" is written in all areas of physical blocks).

Figure 20:
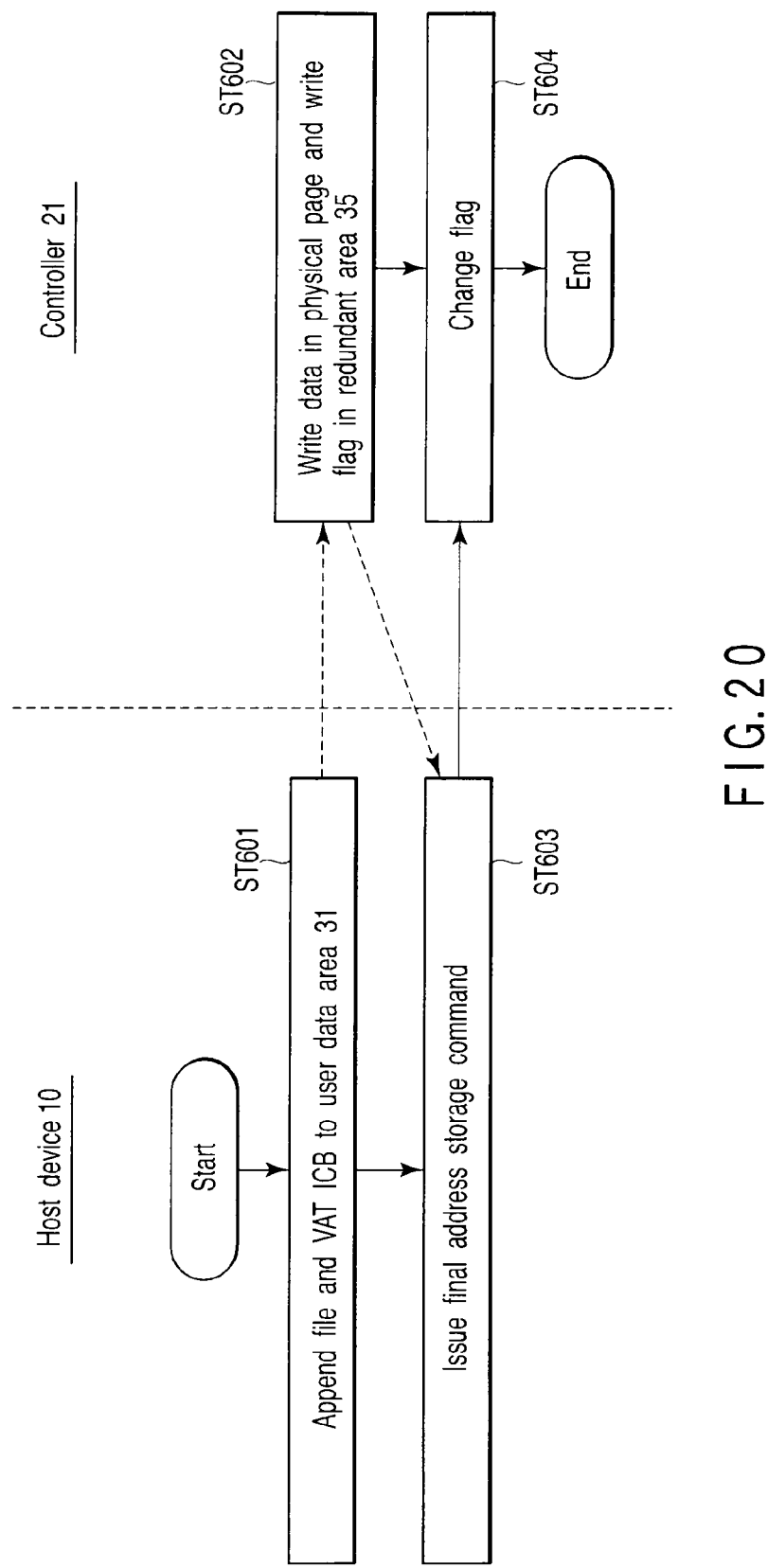
FIG. 20 is a flowchart illustrating the VAT ICB final logical address write operation of a host device 10 and a controller 21.

The VAT ICB final logical address write operation will be described first. FIG. 20 is a flowchart illustrating the VAT ICB final logical address write operation of the host device 10 and controller 21.

The host device 10 appends one file to the user data area 31 of the memory card 20 and writes a VAT ICB at the end of the additionally written area (step ST601). The controller 21 converts the logical address into a physical block address and a physical page address by using a logical address—physical address conversion table and writes data in a physical block. At this time, the controller 21 writes the flag "01" simultaneously in the redundant area 35 of each physical page (step ST602). The flag of each physical page in an unwritten area is set to "11" representing an erased state by the above-described formatting operation.

The logical address—physical address conversion table represents the correlation between logical addresses managed on the side of the host device 10 and physical addresses as actual addresses on the side of the flash memory 22. The logical addresses and physical addresses do not match. A logical address is converted into a physical address by using the logical address—physical address conversion table. After that, a physical block to be actually accessed is specified on the basis of the physical address. The logical address-physical address conversion table is stored in a RAM 27.

When the writing of the file and VAT ICB has ended (e.g., busy is canceled), the host device 10 issues a final address storage command to the memory card 20 (step ST603).

Upon receiving the final address storage command, the controller 21 changes the type of flag to be written in the redundant area 35 of each physical page as the subsequent write target to "01". When the next final address storage command is issued, the controller 21 changes the type of flag to be written in the redundant area 35 of each physical page as the subsequent write target to "10". In a similar manner, the controller 21 changes the type of flag to be written in the redundant area 35 every time a file is written.

Figure 21:
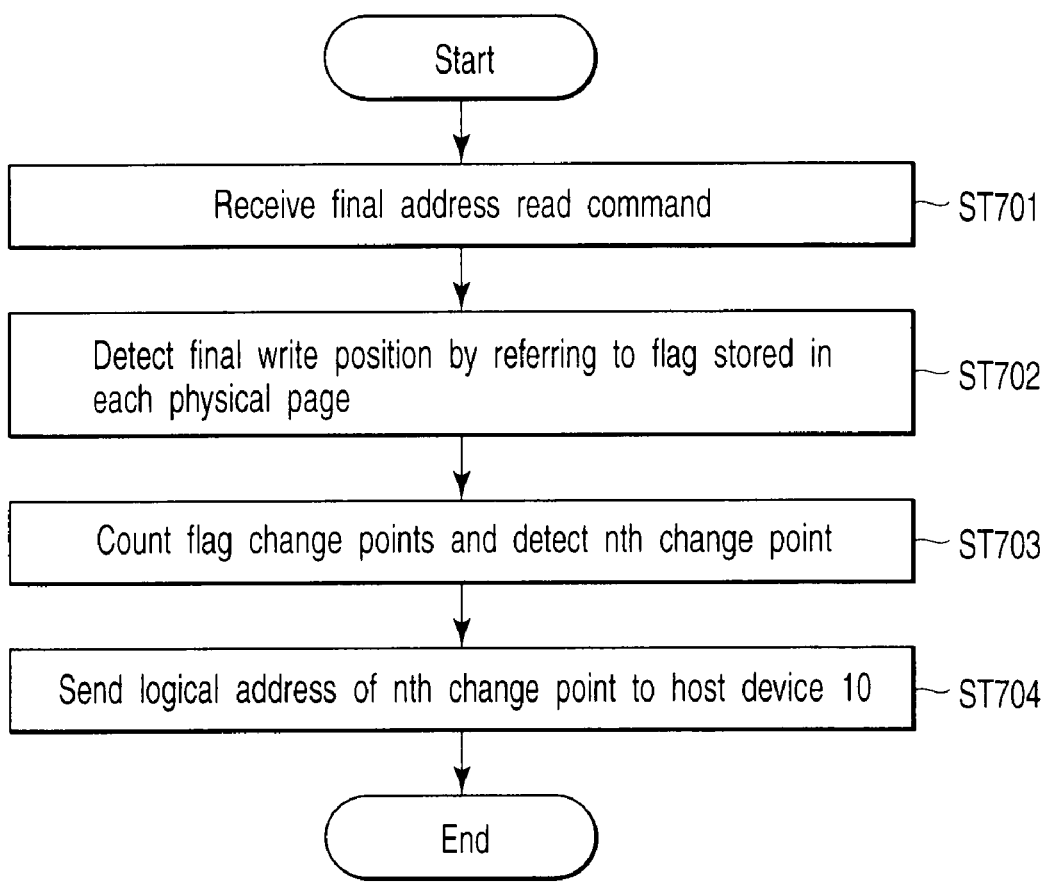
FIG. 21 is a flowchart illustrating the VAT ICB final logical address read operation of the controller 21.

The VAT ICB read operation will be described next. FIG. 21 is a flowchart illustrating the VAT ICB final logical address read operation of the controller 21. The host device 10 issues a final address read command to the memory card 20 while setting a command parameter to n (n is an integer, n≧0).

Upon receiving the final address read command (step ST701), the controller 21 detects the final write position corresponding to the highest logical address in the written area by referring to the flags stored in the physical pages along the logical addresses (step ST702). More specifically, the controller 21 detects a physical page with the highest logical address from physical pages having flags except "11".

The controller 21 traces the logical addresses from the final write position and sequentially counts change points where the flag changes from "01" to "10" and from "10" to "01". The controller 21 detects the nth change point corresponding to the command parameter (step ST703).

The controller 21 sends the logical address of the nth change point to the host device 10 (step ST704). The logical address corresponds to the final logical address of a VAT ICB in the past. Hence, the host device 10 can acquire the VAT ICB by using the logical address. The host device 10 can also access a desired file by using the VAT ICB.

As described above in detail, in this embodiment, every time a file is updated, a flag to be written in the redundant area 35 of a physical page is changed. This embodiment makes it possible to detect the change point of the flag and access a desired file by using the logical address of the change point. Hence, even when the memory card 20 is removed from the host device 10 during data writing, it is possible to trace the VAT ICB for each file and minimize the number of inaccessible files.

In this embodiment, it is possible to read a VAT ICB in the past by using not the management data area 32 but only the user data area 31.

In the above embodiments, a file system complying with the UDF has been described. However, the embodiments are also applicable to an incremental write file system of another type. The embodiments are also applicable to various kinds of memory cards using a flash memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A memory device using a file system which supports an incremental write method, comprising:
    a storage area which is formed of a nonvolatile semiconductor memory and stores a file and management information of the file, the management information being written at an end of a written area every time a file is updated; and
    a controller which sends a logical address corresponding to a final write position of the written area in response to a read request from the host, wherein the controller records the final write position in the storage area in response to a storage request from a host, wherein the storage area includes a plurality of physical blocks each serving as a data erase unit, each physical block including a plurality of physical pages each serving as a data write unit, and the controller writes data in the storage area and simultaneously writes a flag in a redundant area of the physical page, and changes the flag for each storage request, wherein the controller detects the final write position by using the flag stored in the redundant area in response to the read request from the host, and sends the logical address of the final write position to the host.

2. The device according to claim 1, wherein the storage area includes a first area and a second area, the first area storing the file and the management information, and the controller writes the logical address of the final write position in the second area every time the storage request is received from the host.

3. The device according to claim 2, wherein the controller sends the logical address stored in the second area to the host in response to the read request from the host.

4. The device according to claim 3, wherein in response to the read request, the controller sends, to the host, a logical address of a final write position designated by the host from a plurality of final write positions stored in the second area.

5. The device according to claim 1, wherein in response to the read request, the controller detects a final write position designated by the host from a plurality of final write positions by using the flag.

* * * * *